US006865027B2

(12) United States Patent
Shirasuna

(10) Patent No.: US 6,865,027 B2
(45) Date of Patent: Mar. 8, 2005

(54) ZOOM LENS AND CAMERA HAVING THE SAME

(75) Inventor: Takashi Shirasuna, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/350,568

(22) Filed: Jan. 24, 2003

(65) Prior Publication Data

US 2003/0142412 A1 Jul. 31, 2003

(30) Foreign Application Priority Data

Jan. 25, 2002 (JP) ........................ 2002-016945

(51) Int. Cl.[7] .............................................. G02B 15/14
(52) U.S. Cl. ...................... 359/690; 359/687; 359/684
(58) Field of Search ................................ 359/690, 687, 359/685, 684, 683

(56) References Cited

U.S. PATENT DOCUMENTS

| | | | |
|---|---|---|---|
| 5,044,706 A | 9/1991 | Chen | 359/357 |
| 5,268,790 A | 12/1993 | Chen | 359/558 |
| 5,299,064 A | 3/1994 | Hamano et al. | 359/684 |
| 5,790,321 A | 8/1998 | Goto | 359/742 |
| 5,978,153 A * | 11/1999 | Nishio | 359/690 |
| 6,577,450 B2 * | 6/2003 | Hamano et al. | 359/687 |
| 6,606,200 B1 * | 8/2003 | Nakayama et al. | 359/686 |

FOREIGN PATENT DOCUMENTS

JP          4-301811          10/1992

* cited by examiner

*Primary Examiner*—David N. Spector
(74) *Attorney, Agent, or Firm*—Morgan & Finnegan LLP

(57) ABSTRACT

This specification discloses a zoom lens having good optical performance over the whole of an object distance from an infinity object to a super-close range object. This zoom lens system comprises, in order from the front to the rear, a first lens unit of positive optical power, a second lens unit of negative optical power, and a following lens component of positive optical power as a whole. During zooming, the first lens unit moves so that the interval between the first lens unit and the second lens unit may become great at the telephoto end relative to the wide angle end. At least one lens unit moves for focusing resulting from a change in an object distance, and the lens unit moving for the focusing is provided with a diffractive optical surface.

9 Claims, 20 Drawing Sheets

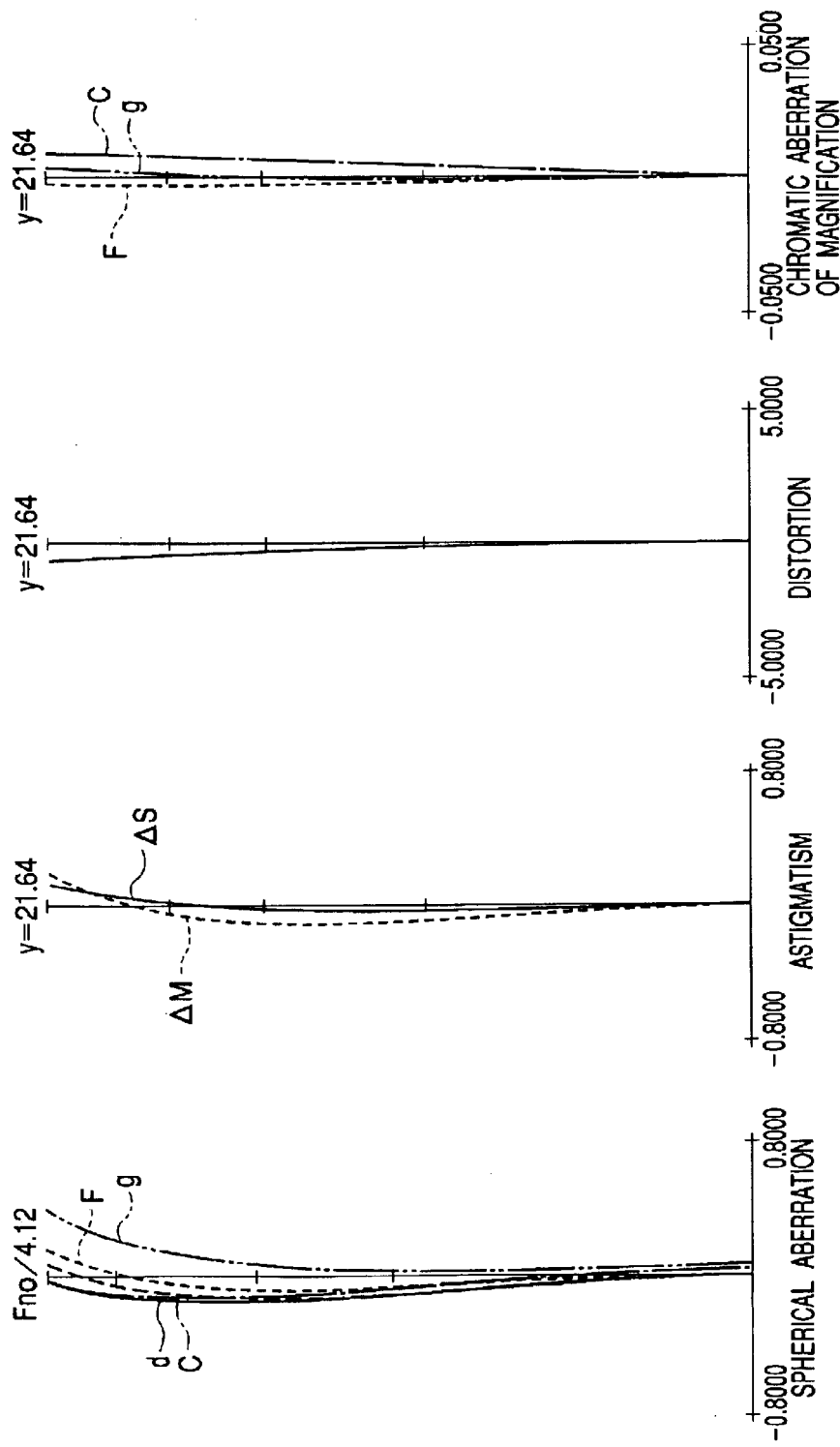
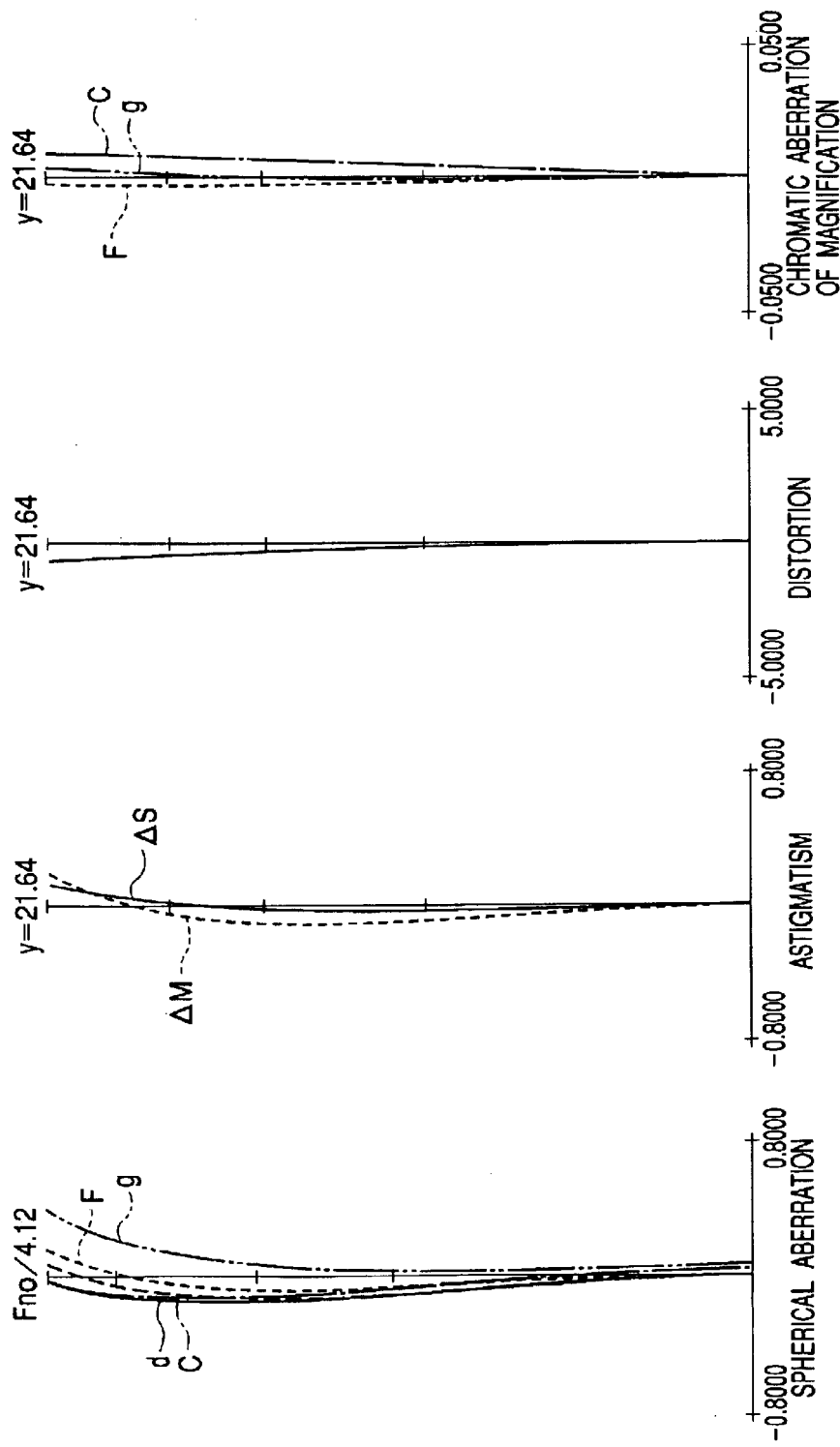
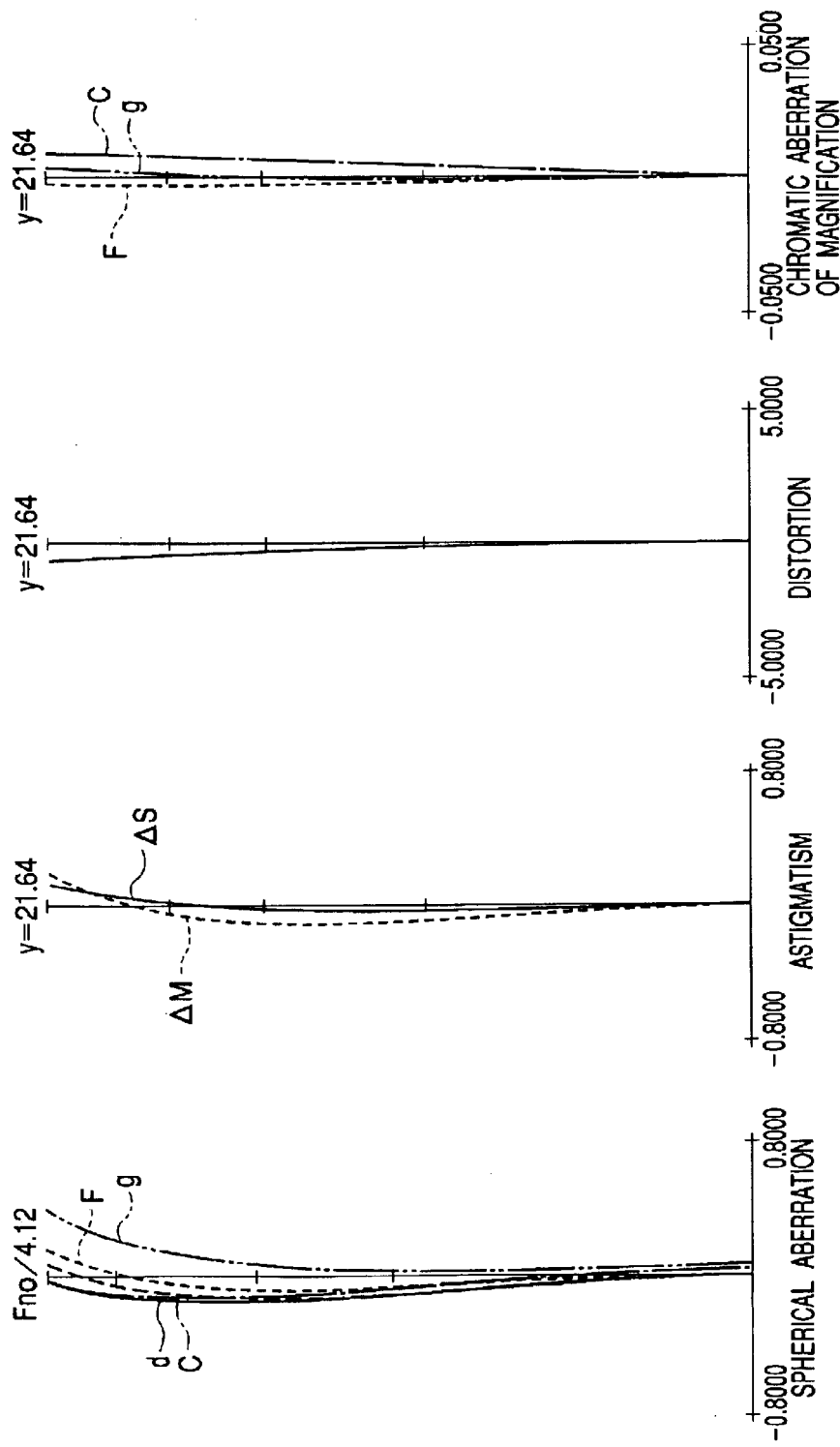
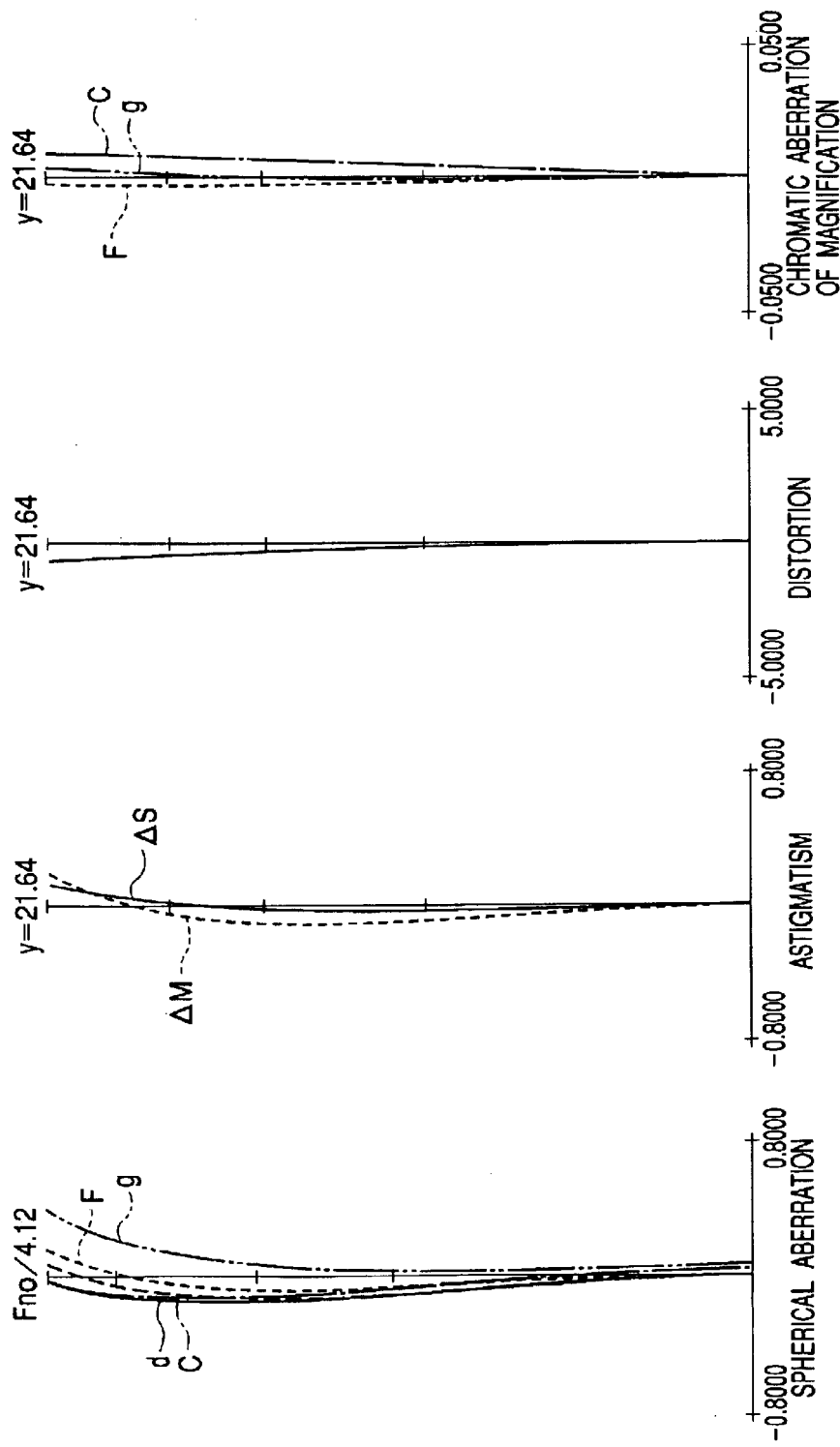

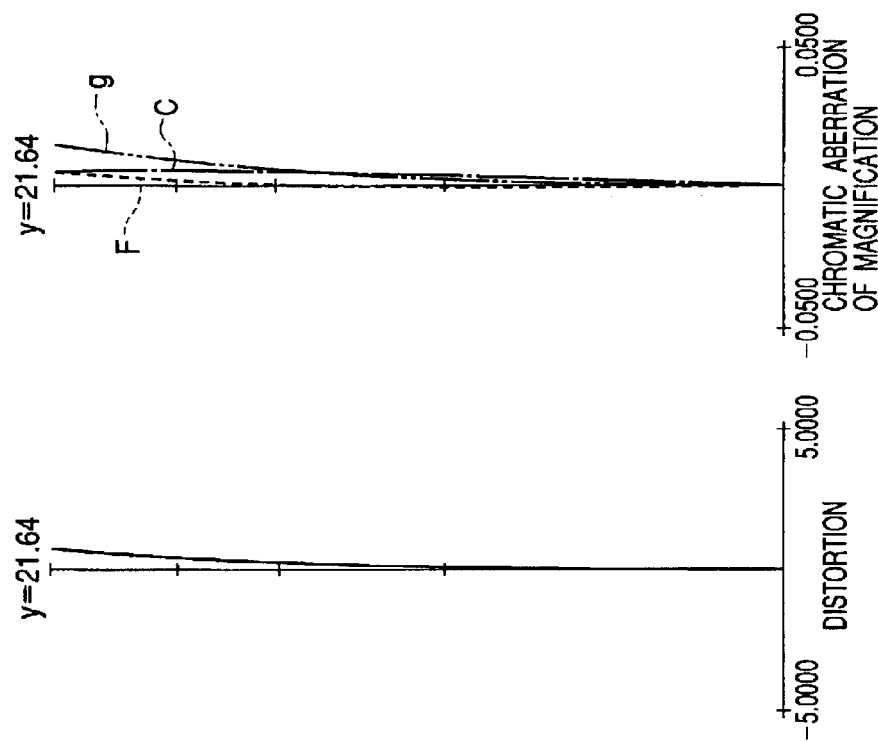

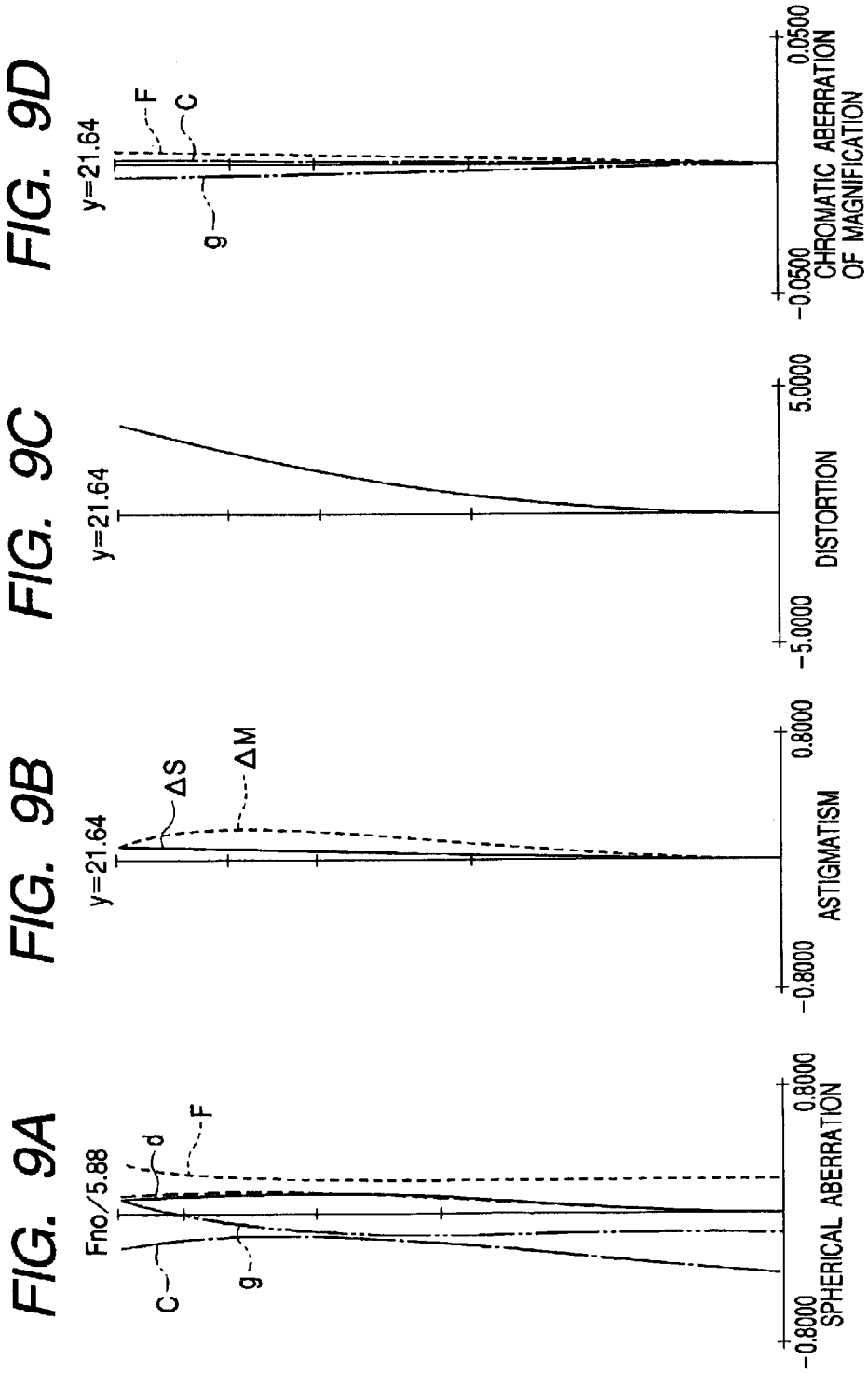

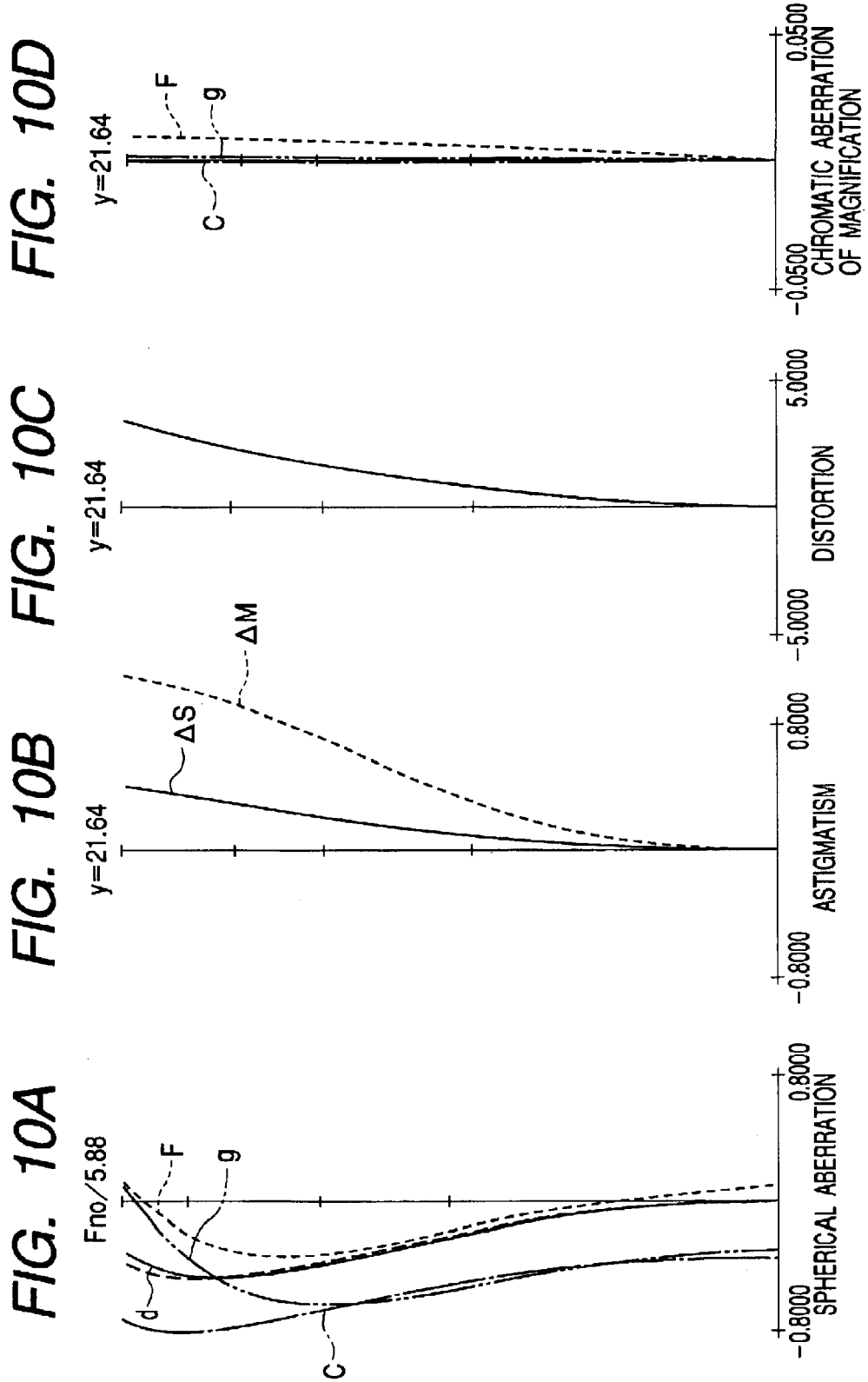

ZOOM LENS AND CAMERA HAVING THE SAME

BACKGROUND OF THE INVENTION

1. Field of the Invention

This invention relates to a zoom lens suitable for a camera for film, a video camera, a digital camera or the like, and particularly to a zoom lens which has achieved good correction of chromatic aberration and which is high in quality of image and compact as a whole.

2. Description of Related Art

In recent years, zoom lenses for a silver halide photographic camera, a video camera and a digital camera have been required to be high in variable power and high in quality of image due to the finer particles of photographic film and the higher pixels of CCD.

Also, in respect of the enlargement of a photographing area, irrespective of a silver halide photographic camera, a video camera or a digital camera, there is desired a phototaking lens having a longer focal length and capable of effecting high magnification photographing and above all, the desire for a telephoto type zoom lens including a long focal length is great.

In a photo-taking lens of such a long focal length, however, the correction of curvature of image field and astigmatism is relatively easy, whereas it is very difficult to suppress the occurrence of chromatic aberration to a small level. Also, when the lens system is constituted by only an ordinary refracting optical system, to maintain satisfactory optical performance, the telephoto ratio of the entire lens system must be of a certain degree of magnitude or greater.

As a result, the lens system of such a long focal length becomes very great in the full length of the lens and becomes very inconvenient to handle. These difficulties becomes more remarkable when an attempt is made to overcome them by a zoom lens including such long focal length.

In Japanese Patent Application Laid-Open No. 4-301811, there is proposed a zoom lens which has, in succession from the object side, five lens units, i.e., a first lens unit of positive refractive power, a second lens unit of negative refractive power, a third lens unit of positive refractive power, a fourth lens unit of positive refractive power and a fifth lens unit of negative refractive power and in which the first lens unit and the second lens unit are moved to the object side and the image plane side, respectively, to thereby effect a focal length change from the wide angle end to the telephoto end, and the fourth lens unit is moved to thereby correct any fluctuation of the image plane resulting from the focal length change and the fourth lens unit is moved to thereby effect focusing.

Also, in Japanese Patent Application Laid-Open No. 4-301612 (corresponding U.S. Pat. No. 5,299,064), there is proposed a zoom lens of a five-unit type which has, in succession from the object side, five lens units, i.e., a first lens unit of positive refractive power, a second lens unit of negative refractive power, a third lens unit of positive refractive power, a fourth lens unit of positive refractive power and a fifth lens unit of negative refractive power and in which the second lens unit is moved to thereby effect a focal length change and the fourth lens unit is moved to thereby effect the correction of the fluctuation of the image plane resulting from the focal length change and focusing, and the whole of the lens system is approximated to a telephoto type to thereby achieve the shortening of the full length of the lens.

On the other hand, the recent zoom lenses have become such that because of the advance of the manufacturing technique and design application of an aspherical surface, the correction of various aberrations determining the performance of the lens is easy even in a construction wherein the number of lenses is small, and this has brought about a very great fruit in the downsizing and higher performance of the zoom lens.

Regarding chromatic aberration, however, the correction thereof depends on the color dispersing characteristic of a glass material forming the lens system and the achromatizing condition by the combination of positive and negative lenses and therefore, the correction of chromatic aberration by an aspherical surface effect cannot be much expected.

As methods of suppressing the occurrence and fluctuation of this chromatic aberration to a small level, in recent years, image pick-up optical systems using a diffractive optical element have been proposed, for example, in Japanese Patent Application Laid-Open No. 4-213421 (corresponding U.S. Pat. No. 5,044,706) and Japanese Patent Application Laid-Open No. 6-324262 (corresponding U.S. Pat. No. 5,790,321). These examples of the prior art are ones in which a diffractive optical element is applied to a single-focus lens system, and make mention of chromatic aberration, but bear no observation and description of the elimination or the like of the fluctuation due to chromatic aberration peculiar to a zoom lens due to zooming, and the application of a diffractive optical element to a zoom lens is not made.

A zoom lens utilizing a diffractive optical element is proposed, for example, in Japanese Patent Application Laid-Open No. 11-133305 (corresponding U.S. Pat. No. 5,978, 153).

In this proposition, in a construction including a first lens unit of positive refractive power, a second lens unit of negative refractive power and a third lens unit of positive refractive power, a diffractive optical surface is disposed in the first lens unit to thereby correct chromatic aberration which is greatly aggravated by a focal length change. No mention is made of the fluctuation of aberrations by focusing, and in that point, there has been room for study.

Also, in U.S. Pat. No. 5,268,790, there is proposed a four-unit zoom lens comprising four lens units of positive, negative, positive and positive refractive power, respectively, in which a diffractive optical element is used in the second lens unit for focal length change or the third lens unit for correcting the fluctuation of the image plane resulting from a focal length change.

Generally in a zoom lens having high variable power and including a long focal length, the fluctuation of chromatic aberration due to a focal length change becomes great and it becomes very difficult to obtain high optical performance over the entire range of focal length change and over the whole of the object distance.

Particularly in a zoom lens of a high variable power ratio in which the zoom ratio is about four times, it is often the case that a cemented lens is used to correct chromatic aberration occurring in each lens unit. For the lens units, there is adopted a method of using an aspherical surface to thereby curtail the number of lenses in the lens units and shorten the full length of the lens.

However, if the number of lenses is decreased, the element for correcting chromatic aberration will become insufficient and it will become difficult to well correct the fluctuation of chromatic aberration resulting from a focal length change.

SUMMARY OF THE INVENTION

The present invention has as its object to set a diffractive optical element and the lens construction of each lens unit appropriately to thereby provide a zoom lens having good optical performance over the entire range of focal length change from the wide angle end to the telephoto end and over the whole of the object distance from an infinity object to a super-close range object.

In order to achieve the above object, a zoom lens system in one form of the present invention is characterized by the provision, in order from the front (object side) to the rear (image side), of a first lens unit of positive optical power, a second lens unit of negative optical power and a following lens component of positive optical power as a whole. During zooming, the first lens unit moves so that the interval between the first lens unit and the second lens unit may become great at the telephoto end relative to the wide angle end. At least one lens unit included in the zoom lens system is moved for focusing resulting from a change in the object distance, and that lens unit moved for the focusing is characterized by a diffractive optical surface.

BRIEF DESCRIPTION OF THE DRAWINGS

FIGS. 7A, 7B, 7C and 7D show the aberrations of the zoom lens according to Embodiment 2 at the wide angle end thereof for an infinity object.

FIGS. 8A, 8B, 8C and 8D show the aberrations of the zoom lens according to Embodiment 2 at the wide angle end thereof for an object at an object distance of 1.8 m.

FIGS. 9A, 9B, 9C and 9D show the aberrations of the zoom lens according to Embodiment 2 at the telephoto end thereof for the infinity object.

FIGS. 10A, 10B, 10C and 10D show the aberrations of the zoom lens according to Embodiment 2 at the telephoto end thereof for the object at the object distance of 1.8 m.

DETAILED DESCRIPTION OF THE PREFERRED EMBODIMENTS

Some embodiments of the present invention will hereinafter be described with reference to the drawings.

Figure 1:
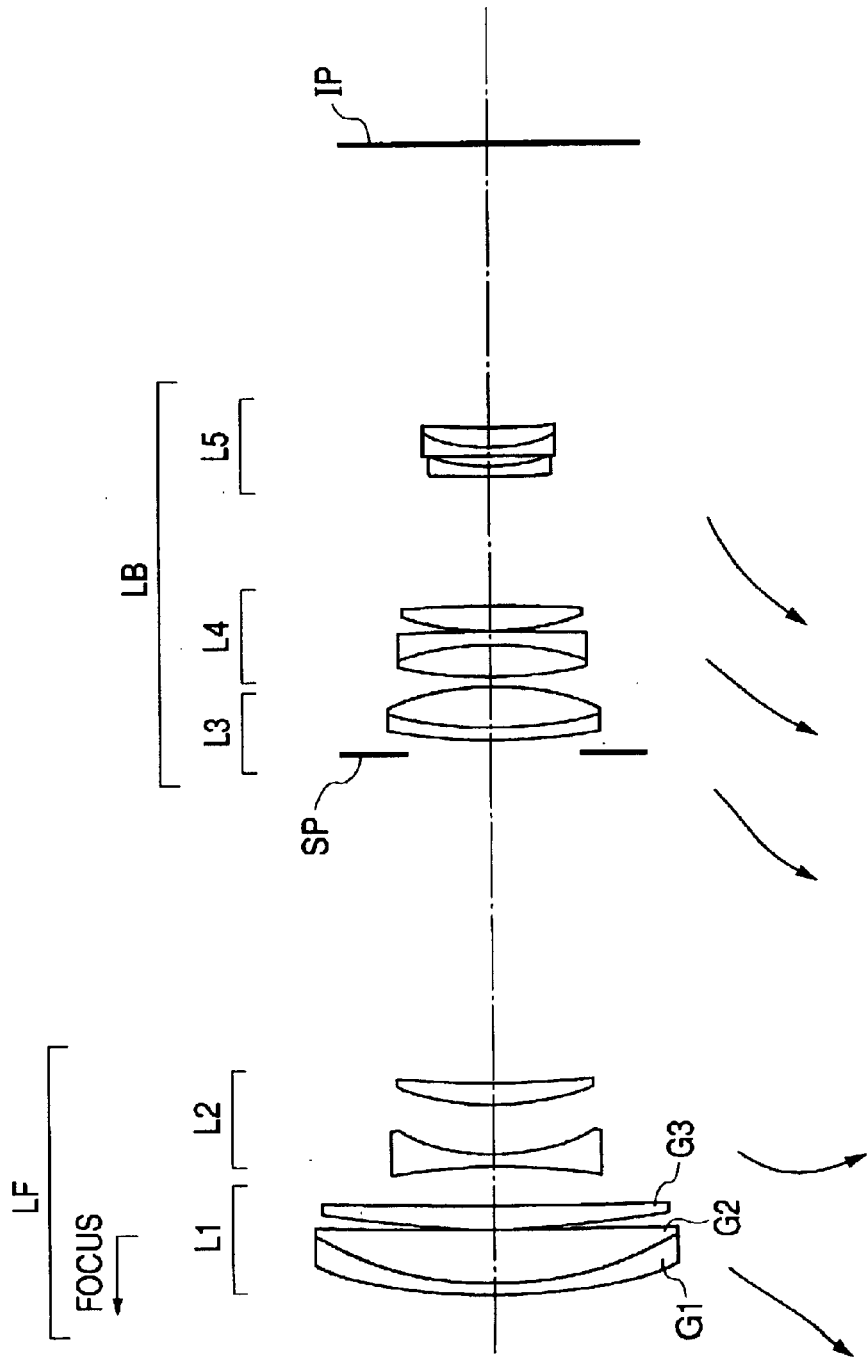
FIG. 1 is a cross-sectional view of a zoom lens according to Embodiment 1 at the wide angle end thereof.
Figure 2:
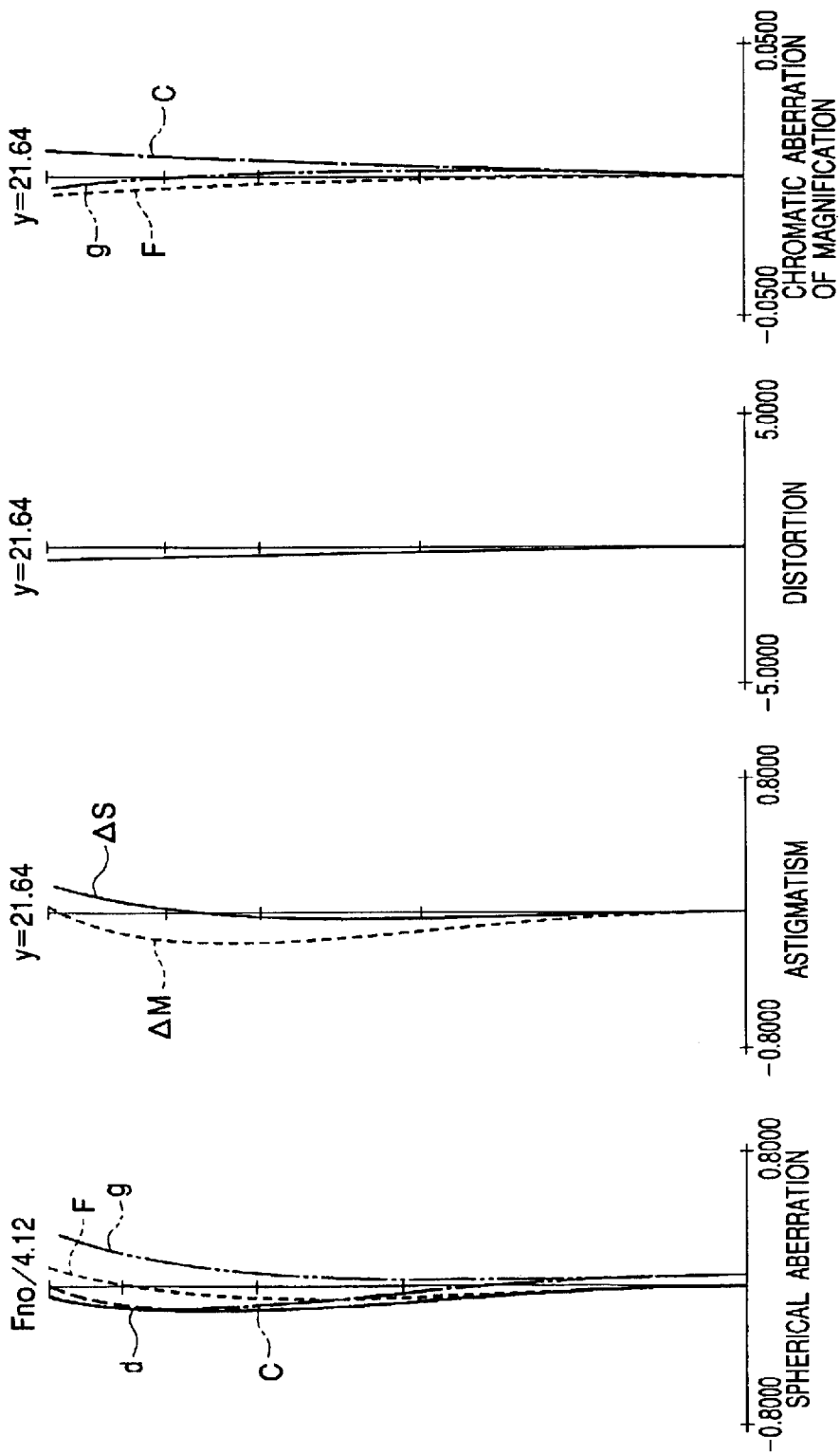
FIGS. 2A, 2B, 2C and 2D show the aberrations of the zoom lens according to Embodiment 1 at the wide angle end thereof for an infinity object.
Figure 3:
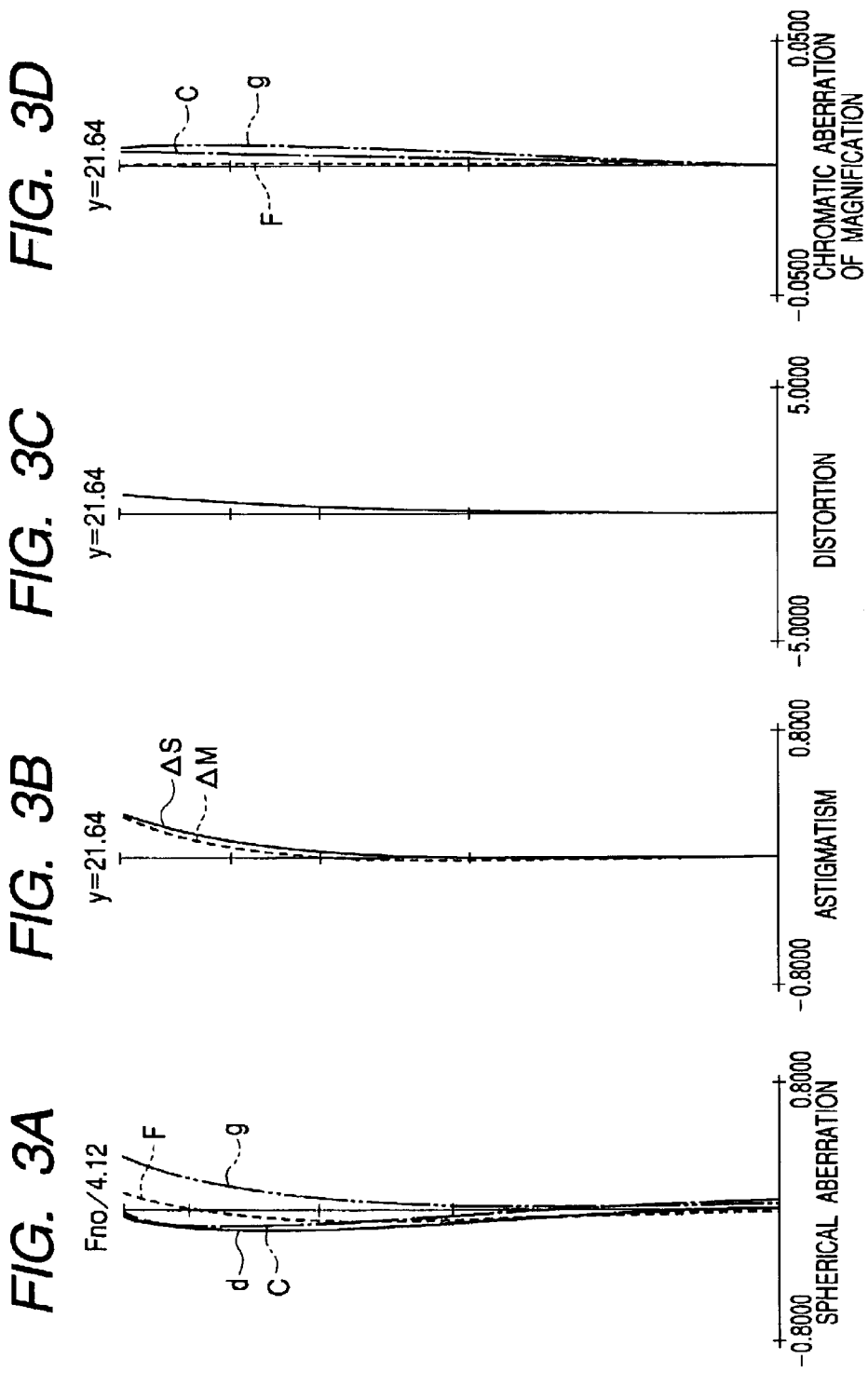
FIGS. 3A, 3B, 3C and 3D show the aberrations of the zoom lens according to Embodiment 1 at the wide angle end thereof for an object at an object distance of 1.8 m.
Figure 4:
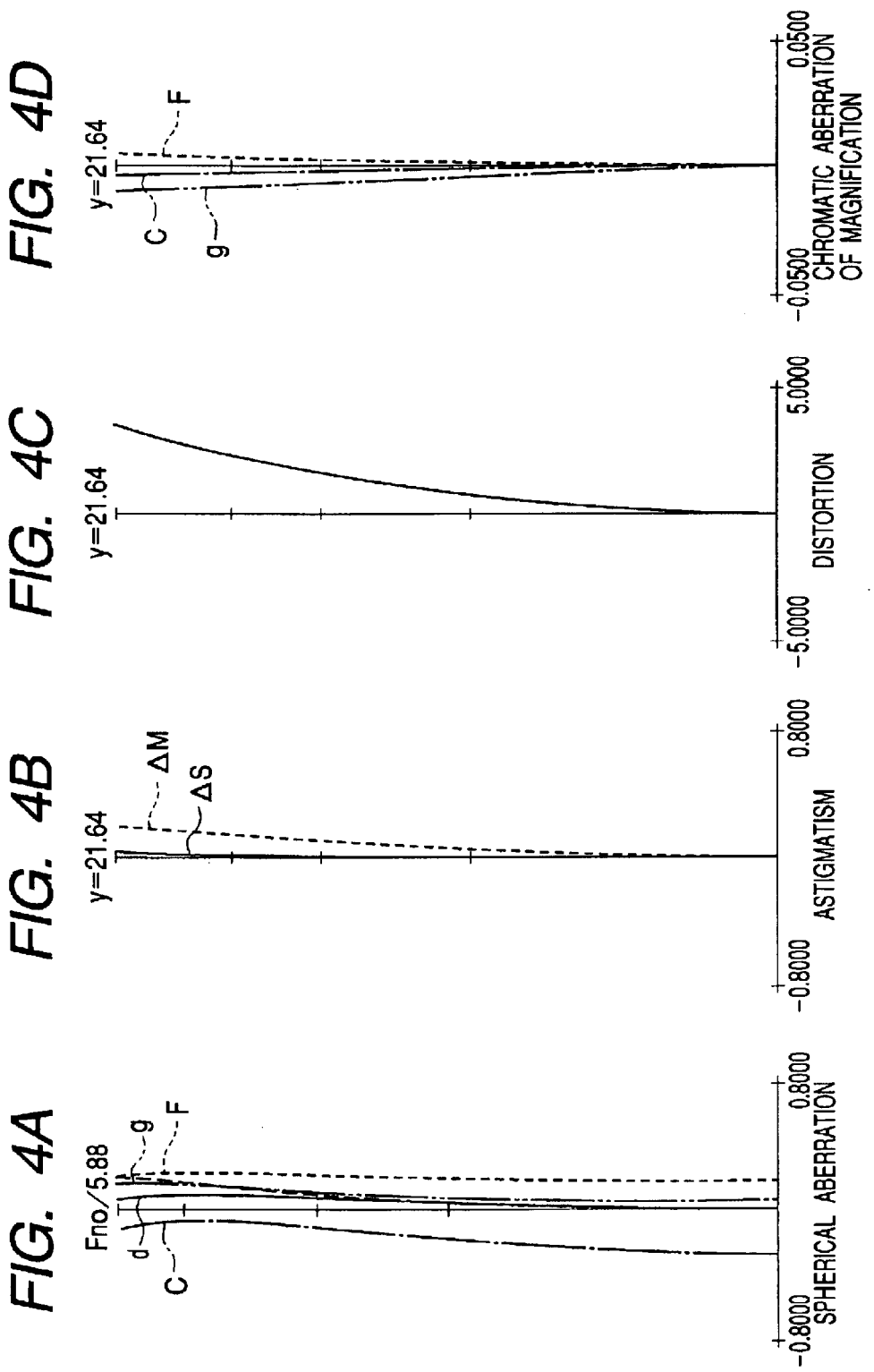
FIGS. 4A, 4B, 4C and 4D show the aberrations of the zoom lens according to Embodiment 1 at the telephoto end thereof for the infinity object.
Figure 5:
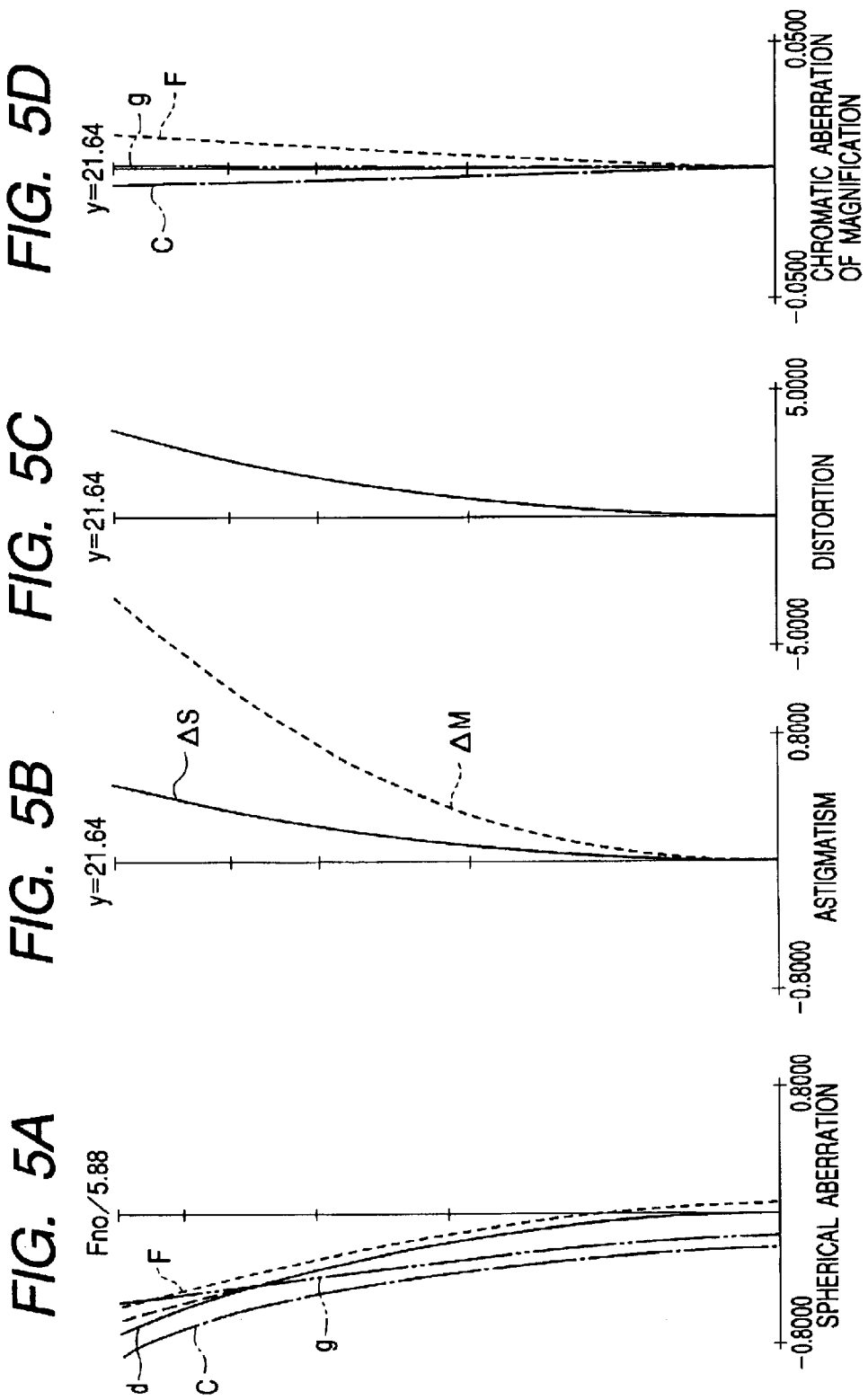
FIGS. 5A, 5B, 5C and 5D show the aberrations of the zoom lens according to Embodiment 1 at the telephoto end thereof for the object at the object distance of 1.8 m.

FIG. 1 is a cross-sectional view of a zoom lens according to Embodiment 1 of the present invention at the wide angle end thereof. FIGS. 2A, 2B, 2C and 2D and 3A, 3B, 3C and 3D show the aberrations of the zoom lens according to Embodiment 1 at the wide angle end thereof when the object distance is infinity and when the object distance is 1.8 m, respectively. FIGS. 4A, 4B, 4C and 4D and 5A, 5B, 5C and 5D show the aberrations of the zoom lens according to Embodiment 1 at the telephoto end thereof when the object distance is infinity and when the object distance is 1.8 m, respectively.

Figure 6:
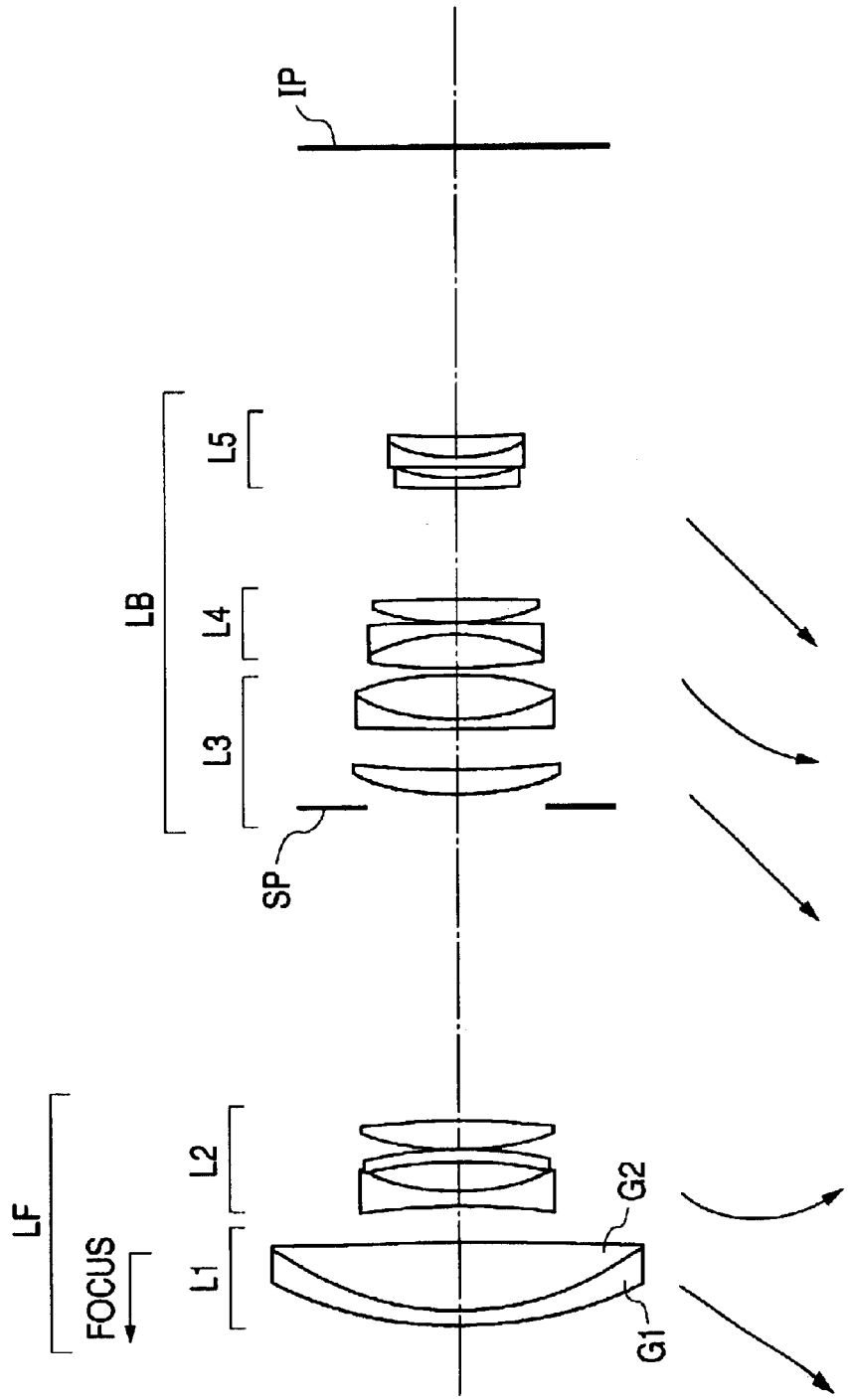
FIG. 6 is a cross-sectional view of a zoom lens according to Embodiment 2 at the wide angle end thereof.

FIG. 6 is a cross-sectional view of a zoom lens according to Embodiment 2 of the present invention at the wide angle end thereof. FIGS. 7A, 7B, 7C and 7D and 8A, 8B, 8C and 8D show the aberrations of the zoom lens according to Embodiment 2 at the wide angle end thereof when the object distance is infinity and when the object distance is 1.8 m, respectively. FIGS. 9A, 9B, 9C and 9D and 10A, 10B, 10C and 10D show the aberrations of the zoom lens according to Embodiment 2 at the telephoto end thereof when the object distance is infinity and when the object distance is 1.8 m, respectively.

Figure 11:
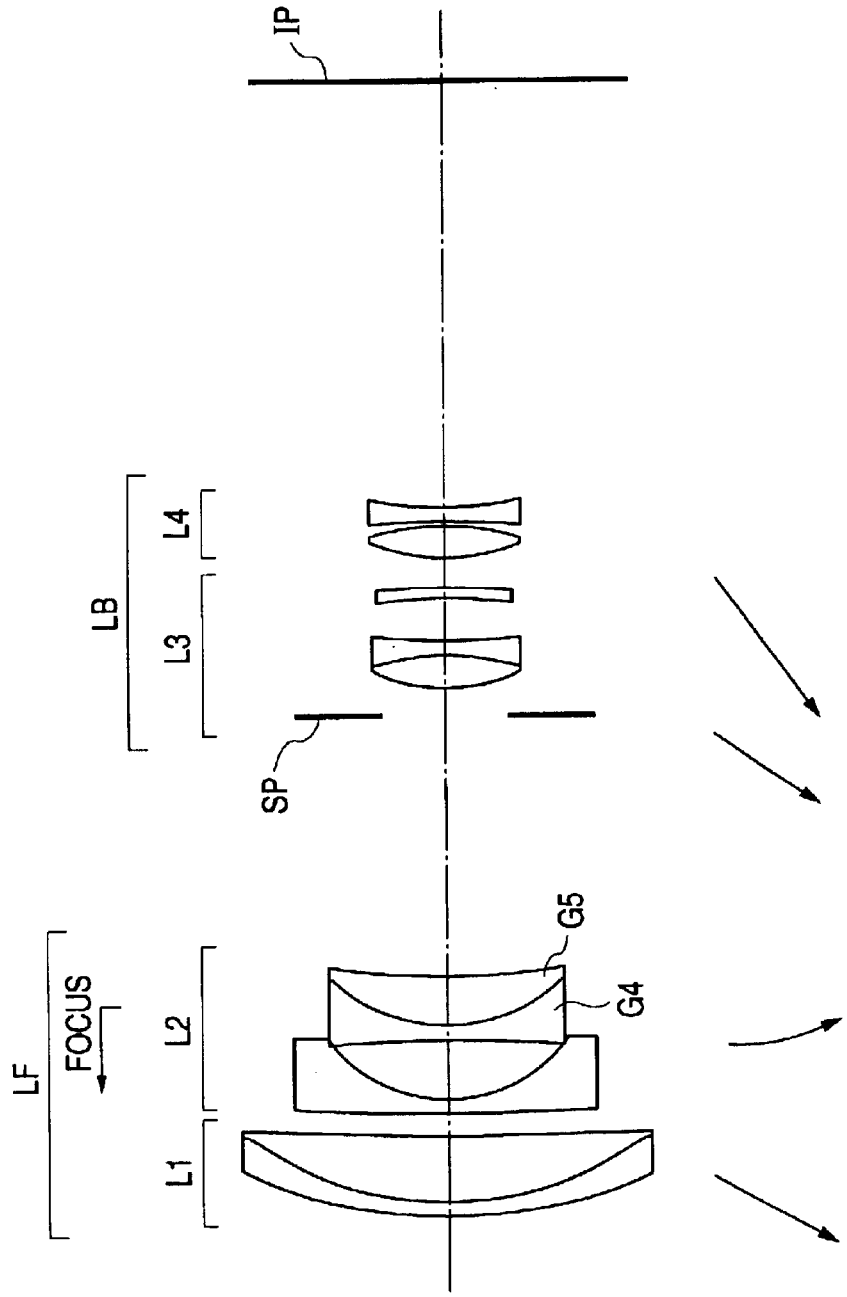
FIG. 11 is a cross-sectional view of a zoom lens according to Embodiment 3 at the wide angle end thereof.
Figure 12:
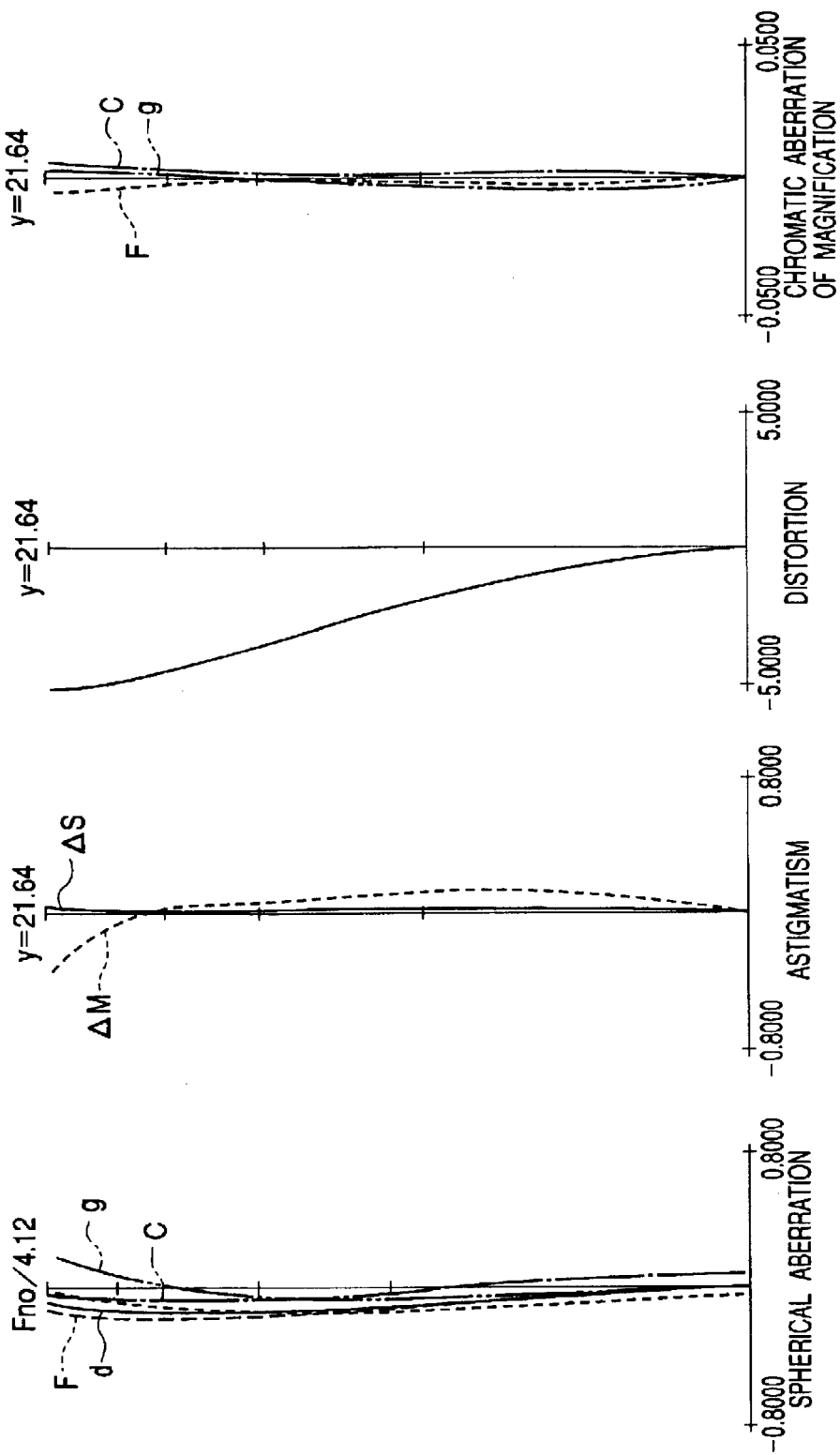
FIGS. 12A, 12B, 12C and 12D show the aberrations of the zoom lens according to Embodiment 3 at the wide angle end thereof for an infinity object.
Figure 13:
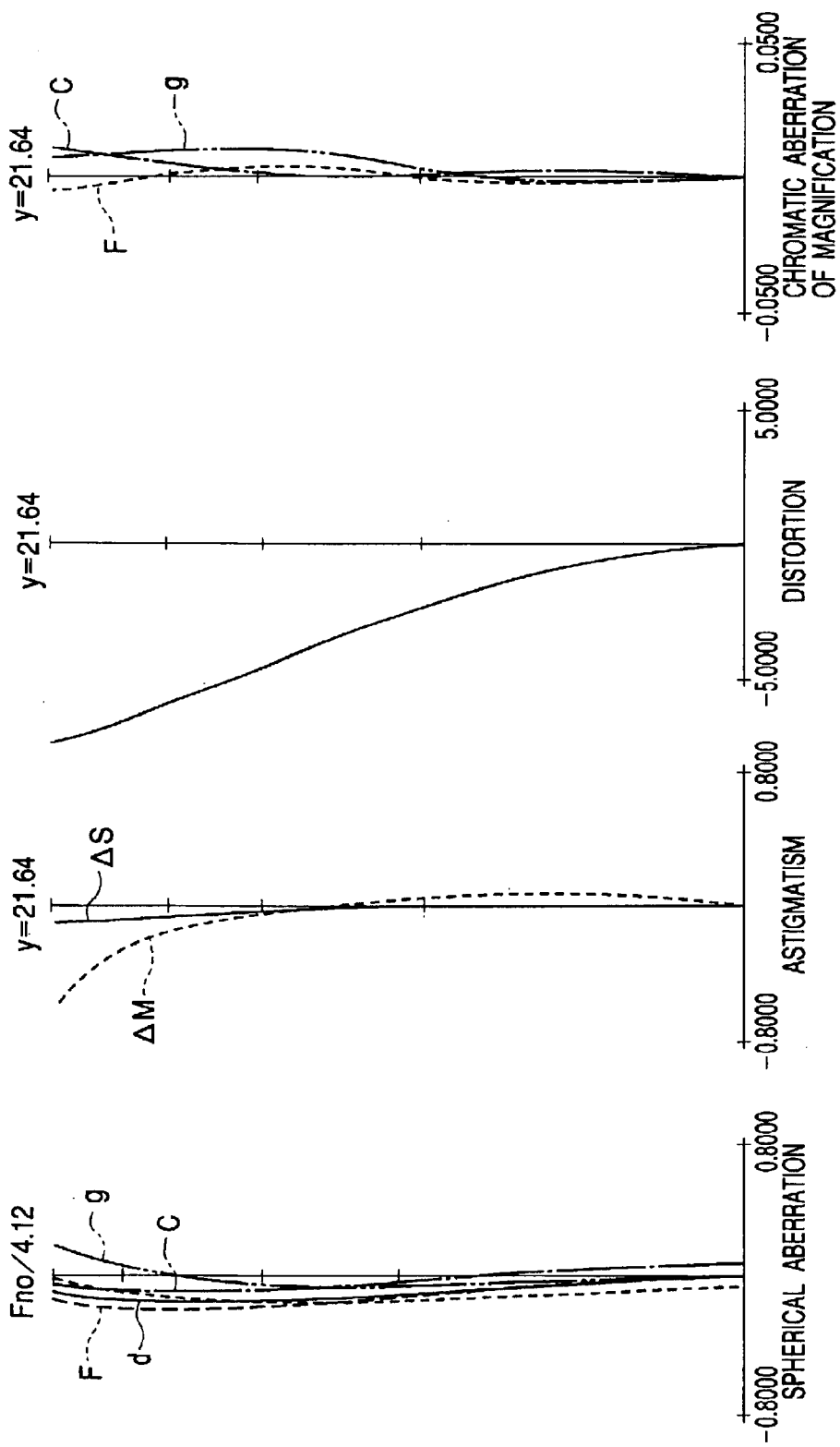
FIGS. 13A, 13B, 13C and 13D show the aberrations of the zoom lens according to Embodiment 3 at the wide angle end thereof for an object at an object distance of 0.8 m.
Figure 14:
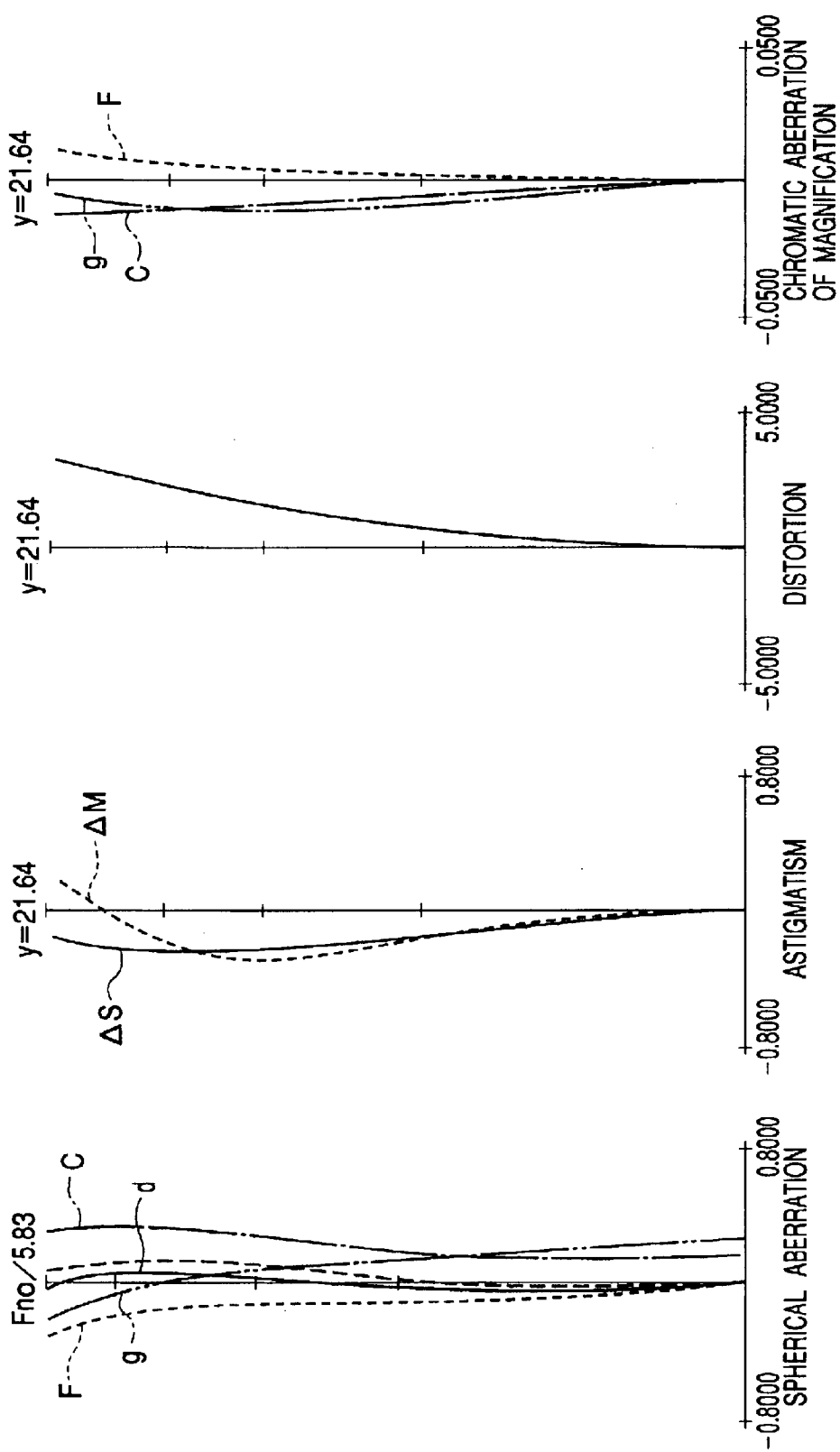
FIGS. 14A, 14B, 14C and 14D show the aberrations of the zoom lens according to Embodiment 3 at the telephoto end thereof for the infinity object.
Figure 15:
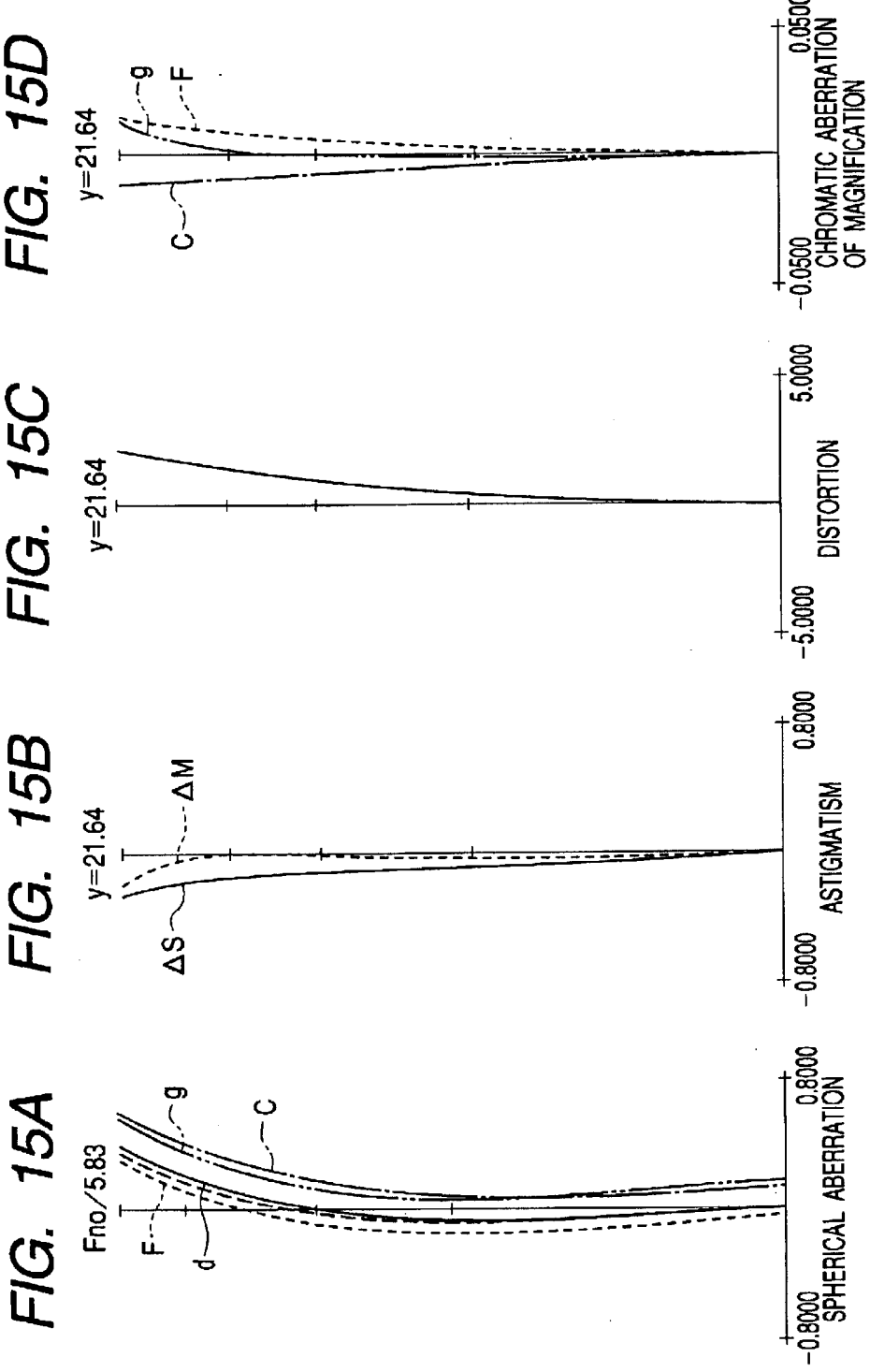
FIGS. 15A, 15B, 15C and 15D show the aberrations of the zoom lens according to Embodiment 3 at the telephoto end thereof for the object at the object distance of 0.8 m.

FIG. 11 is a cross-sectional view of a zoom lens according to Embodiment 3 of the present invention at the wide angle end thereof. FIGS. 12A, 12B, 12C and 12D and 13A, 13B, 13C and 13D show the aberrations of the zoom lens according to Embodiment 3 at the wide angle end thereof when the object distance is infinity and when the object distance is 0.8 m, respectively. FIGS. 14A, 14B, 14C and 14D and 15A, 15B, 15C and 15D show the aberrations of the zoom lens according to Embodiment 3 at the telephoto end thereof when the object distance is infinity and when the object distance is 0.8 m, respectively.

In each of the cross-sectional views of FIGS. 1 and 6 showing Embodiments 1 and 2, L1 designates a first lens unit of positive refractive power (optical power=the reciprocal number of the focal length), L2 denotes a second lens unit of negative refractive power, L3 designates a third lens unit of positive refractive power, L4 denotes a fourth lens unit of positive refractive power, and L5 designates a fifth lens unit of negative refractive power. SP denotes a stop which is provided forwardly of the third lens unit and is moved integrally therewith during zooming. IP designates an image plane on which there is located the image pick-up surface of a solid state image pick-up device such as a CCD or a CMOS or photographic film.

In the cross-sectional views, the left side is the object side (front) and the right side is the image side (rear). This also holds true in the cross-sectional view of Embodiment 3.

The first lens unit L1 and the second lens unit L2 together constitute a preceding lens component LF, and the third lens unit L3, the fourth lens unit L4 and the fifth lens unit L5 together constitute a following lens component LB of positive refractive power as a whole. Arrows indicate the movement loci of the respective lens units resulting from zooming from the wide angle end to the telephoto end.

In the zoom lenses according to Embodiments 1 and 2, the respective lens units are moved during zooming so that at the telephoto end relative to the wide angle end, the interval between the first lens unit L1 and the second lens unit L2 may become great, the interval between the second lens unit L2 and the third lens unit L3 may become small, the interval between the third lens unit L3 and the fourth lens unit L4 may become great, and the interval between the fourth lens unit L4 and the fifth lens unit L5 may become small. Also, the stop SP is moved integrally with the third lens unit L3, but may be moved independently of the latter.

Embodiments 1 and 2 are of such a construction that during zooming from the wide angle end to the telephoto end, the first lens unit L1 moves to the object side so that the interval between the first lens unit L1 and the second lens unit L2 may be increased. Also, the focusing when the object distance changes from an infinity object to a close range object is effected by the first lens unit L1 being moved to the object side.

By adopting such a construction, the positive refractive power of the first lens unit L1 bears a role for taking refractive power arrangement of the telephoto type particularly on the telephoto side, and an F number beam (axial bundle on-axis beam) is converged by the first lens unit L1, whereby the effective outer diameter of the succeeding lens component LB is made small to thereby make the entire lens system compact. Also, by adopting a construction in which the first lens unit L1 moves on the optical axis thereof to thereby effect focusing, the fluctuation of aberrations during focusing is suppressed and the simplification of the mechanical mechanism thereof is made easy.

In the zoom lens according to Embodiment 1 shown in FIG. 1, in the above-described construction, the first lens unit for effecting focusing is comprised of a negative first lens G1, a positive second lens G2 and a positive third lens G3, and a diffractive optical surface constituted by a diffraction grating rotation-symmetrical with respect to the optical axis is provided in the first lens unit L1. By adopting such a construction, on-axis chromatic aberration and chromatic aberration of magnification greatly aggravated during focusing are suppressed by the chromatic aberration correcting ability of the diffractive optical surface, and the aspherical surface effect of the diffractive optical surface is effectively utilized to suppress the deterioration of the quality of image by the other aberrations during focusing to the utmost. As described above, the diffractive optical surface is constituted by a phase type diffraction grating and therefore, actually has a predetermined thickness, but the thickness is such a degree of thickness as can be geometric-optically neglected and therefore, in Embodiments 1 to 3, this surface is called the diffractive optical surface (diffractive surface) with the thickness thereof neglected.

Also, according to Embodiment 1, there is realized a zoom lens in which on the diffractive optical surface, an on-axis beam (axial bundle) passes with a great beam width and an off-axis peripheral beam (off-axis bundle) passes through a high range off the optical axis, and it is possible to well correct even axial chromatic aberration and lateral chromatic aberration which are greatly aggravated during the zooming from the wide angle end to the telephoto end, and which has high optical performance in the entire focal length change area and the entire focusing area.

Also, in the construction as described above, the diffractive optical surface bears the role of correcting chromatic aberration occurring particularly remarkably on the telephoto end side and therefore, the appointment of the chromatic aberration correction by the other optical elements (lenses) having refractive power alone may be very small. Therefore, it becomes unnecessary to use low dispersion glass of which the specific gravity is relatively great and the Abbe number is 75 or greater, and it becomes possible to make the whole of the first lens unit L1 lighter in weight and therefore, the burden to a driving mechanism when focusing is effected by the first lens unit L1 is mitigated, and this is very advantageous.

Also, in Embodiment 1, the diffractive optical surface is disposed in the first lens unit with laminated structure on the adjacent surfaces of the first lens G1 and the second lens G2 spaced apart from each other with a minute air space interposed therebetween. By adopting such a construction, the diffractive optical surface can be hermetically formed, and this is advantageous for protecting the diffractive optical surface which is of very minute structure from stains, injury, deformation, etc.

Further, the adjacent surfaces having same shape which surface are separated by the minute air space is regarded as a same as the diffractive optical surface in geometrical optics.

Therefore, the above adjacent surfaces are treated as a composition surface of the diffractive optical surface in numerical examples corresponding to embodiments.

Also, it is preferable that the diffractive optical surface provided in the first lens unit L1 be provided on a flat surface or a lens surface having its convex surface facing the object side so that rays of light from an on-axis object point and an off-axis object point may be incident on the diffractive optical surface as perpendicularly thereto as possible, whereby a reduction in diffraction efficiency can be alleviated. Desirably, the diffractive optical surface may be set on such a lens surface on which the rays of light are incident at less than ±15° with respect to a normal to the lens surface.

In Embodiment 1, the first lens unit L1 is comprised, in succession from the object side, of a meniscus-shaped negative lens having its convex surface facing the object side, a positive lens having its convex surface facing the object side, and a positive lens having its convex surface facing the object side.

The second lens unit L2 is comprised, in succession from the object side, of a negative lens of which the two lens surfaces are concave surfaces, and a positive lens having its convex surface facing the object side.

The third lens unit L3 is comprised, in succession from the object side, of a meniscus-shaped negative lens having its convex surface facing the object side, and a positive lens of which the two lens surfaces are convex surfaces.

The fourth lens unit L4 is comprised, in succession from the object side, of a positive lens of which the two lens surfaces are convex surfaces, a negative lens having its concave surface facing the object side, and a positive lens of which the two lens surfaces are convex surfaces.

The fifth lens unit L5 is comprised, in succession from the object side, of a meniscus-shaped negative lens having its convex surface facing the object side, a negative lens having its concave surface facing the image plane side, and a positive lens having its convex surface facing the object side.

In Embodiment 2 of FIG. 6 as in Embodiment 1, a diffractive optical surface is provided in the first lens unit L1 to thereby obtain an effect similar to that of Embodiment 1. Also, the first lens unit is of a two-lens construction comprising a negative first lens G1 and a positive second lens G2. In Embodiment 2, the diffractive optical surface is disposed between the first lens G1 and the second lens G2 in the first lens unit L1 to thereby obtain an effect similar to that of Embodiment 1 and also, the aberration correcting ability of the first lens unit L1 is maintained and yet the number of constituent lenses is decreased.

In Embodiment 2, when design is made such that focusing is effected by the first lens unit L1, the first lens unit L1 is made into a two-lens construction as previously described, to thereby mitigate the driving load when focusing is effected by the first lens unit L1.

In Embodiment 2, the first lens unit L1 is comprised, in succession from the object side, of a meniscus-shaped negative lens having its convex surface facing the object side, and a positive lens having its convex surface facing the object side.

The second lens unit L2 is comprised, in succession from the object side, of a negative lens of which the two lens surfaces are concave surfaces, a negative lens having its concave surface facing the object side, and a positive lens of which the two lens surfaces are convex surfaces.

The third lens unit L3 is comprised, in succession from the object side, of a meniscus-shaped positive lens having its convex surface facing the object side, a meniscus-shaped negative lens having its convex surface facing the object side, and a positive lens of which the two lens surfaces are convex surfaces.

The second lens unit L4 is comprised, in succession from the object side, of a positive lens of which the two lens surfaces are convex surfaces, a negative lens having its concave surface facing the object side, and a positive lens having its convex surface facing the object side.

The fifth lens unit L5 is comprised, in succession from the object side, of a meniscus-shaped negative lens having its convex surface facing the object side, a negative lens having its concave surface facing the image plane side, and a positive lens having its convex surface facing the object side.

Description will now be made of a zoom lens according to Embodiment 3 differing in construction from Embodiments 1 and 2.

In the cross-sectional view of FIG. 11 showing Embodiment 3, L1 designates a first lens unit of positive refractive power, L2 denotes a second lens unit of negative refractive power, L3 designates a third lens unit of positive refractive power, and L4 denotes a fourth lens unit of positive refractive power. SP designates an aperture stop which is disposed forwardly of the third lens unit L3 and is moved integrally therewith during zooming. IP denotes the image plane on which there is located the image pick-up surface of a solid state image pick-up device or photographic film.

The first lens unit L1 and the second lens unit L2 together constitute a preceding lens component LF, and the third lens unit L3 and the fourth lens unit L4 together constitute a succeeding lens component LB of positive refractive power as a whole. Arrows indicate the movement loci of the respective lens units resulting from zooming from the wide angle end to the telephoto end.

In the zoom lens according to Embodiment 3, the respective lens units are moved during zooming so that at the telephoto end relative to the wide angle end, the interval between the first lens unit L1 and the second lens unit L2 may become great, the interval between the second lens unit L2 and the third lens unit L3 may become small and the interval between the third lens unit L3 and the fourth lens unit L4 may become small.

Embodiment 3 shown in FIG. 11 is of such a construction that during zooming from the wide angle end to the telephoto end, the first lens unit L1 is moved to the object side so that the interval between the first lens unit L1 and the second lens unit L2 may be increased. The focusing when the object distance changes from an infinity object to a close range object is effected by the second lens unit L2 being moved to the object side.

Again in this embodiment, a diffractive optical surface similar to that in Embodiment 1 is disposed on the adjacent surfaces of the fourth lens G4 and the fifth lens G5 in the second lens unit L2 which is a focusing lens unit spaced apart from each other with a minute air space interposed therebetween. Thereby an effect similar to that of Embodiment 1 is obtained. That is, there is realized a zoom lens in which good optical performance is maintained also in the focusing from an infinity object to a close range object.

In Embodiment 3, the first lens unit L1 is comprised, in succession from the object side, of a meniscus-shaped negative lens having its convex surface facing the object side, and a positive lens having its convex surface facing the object side.

The second lens unit L2 is comprised, in succession from the object side, of a negative lens having its concave surface facing the image plane side, a negative lens having its concave surface facing the image plane side, and a positive lens having its convex surface facing the object side.

The third lens unit L3 is comprised, in succession from the object side, of a positive lens of which the two lens surfaces are convex surfaces, a negative lens having its concave surface facing the object side, and a negative lens having its concave surface facing the object side.

The fourth lens unit L4 is comprised, in succession from the object side, of a positive lens of which the two lens surfaces are convex surfaces, and a negative lens having its concave surface facing the image plane side.

The diffractive optical element used in each embodiment is such that in Embodiments 1 and 2 wherein it is disposed in the first lens unit L1 of positive refractive power, the diffractive optical surface has positive optical power (the inverse number of the focal length), and is such that in Embodiment 3 wherein it is disposed in the second lens unit L2 of negative refractive power, the diffractive optical surface has negative optical power. Thereby, chromatic aberration caused by refraction is negated by the diffractive optical surface.

While in each embodiment, use is made of a diffractive optical element (an element having a diffractive optical surface), a diffractive optical element may be further added, and according to this, better optical performance is obtained. The added diffractive optical element may have positive optical power or negative optical power, and particularly when a diffractive optical element of negative optical power is to be added, it may preferably be disposed at a position near to the image plane of the optical system whereat the incidence height of a pupil paraxial ray is relatively high and the incidence height of a paraxial on-axis ray is relatively low. According to this, lateral chromatic aberration can be corrected better. Also, while each diffractive optical element is disposed on a flat surface or a spherical surface, it may be disposed on an aspherical surface as a base, or may be disposed on each of opposed surfaces. Further, the material of the base need not always be glass, but may be any other material transmitting light therethrough such as plastics.

The diffractive optical element may be manufactured as a binary optic which is an optical element binarily manufactured by the lithographic technique which is a technique of manufacturing a holographic optical element. Also, it may be manufactured by a mold prepared by these methods. It may also be prepared by a method of transferring film of a plastic or the like as the diffractive optical surface to an optical surface (such as a so-called compound type aspherical surface).

Figure 16:
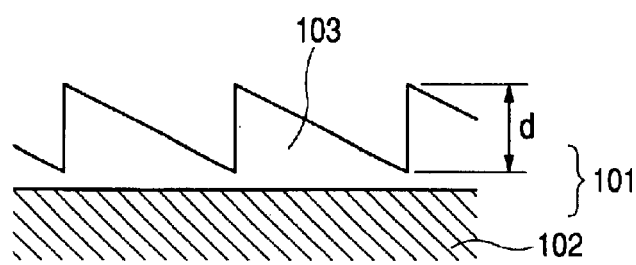
FIG. 16 is an illustration of a diffractive optical element of single-layer structure.
Figure 17:
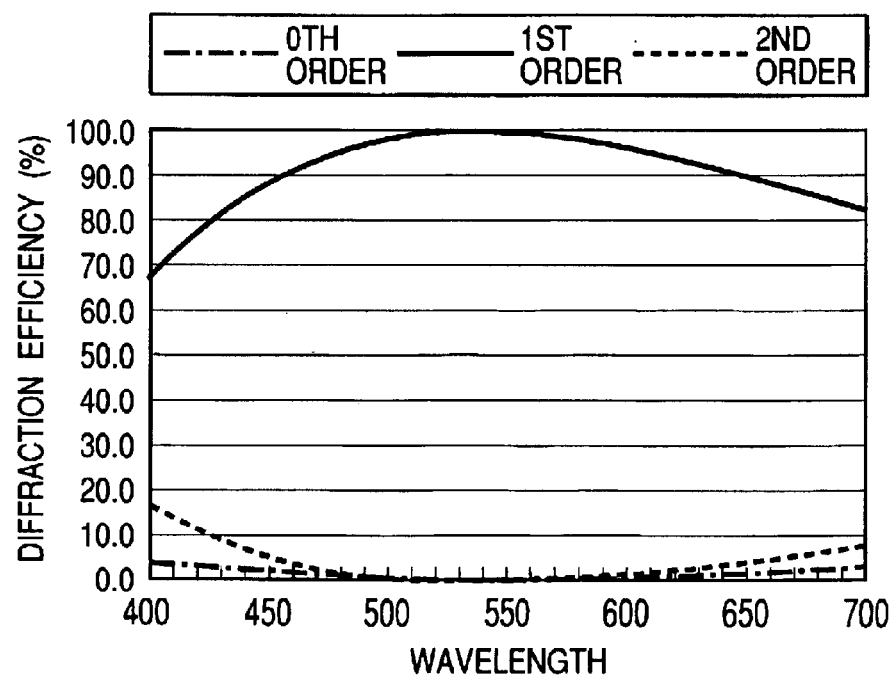
FIG. 17 is an illustration of the wavelength depending characteristic of the diffractive optical element of single-layer structure.

The Kinoform shape shown, for example, in FIG. 16 is applicable as the shape of a diffraction grating provided on the diffractive optical surface of the diffractive optical element represented by a phase shape. FIG. 17 shows the wavelength depending characteristic of the 1st order diffraction efficiency of the diffractive optical element shown in FIG. 16. The actual diffractive optical element 101 is constructed by providing a diffraction grating comprising a substrate 102 having ultraviolet-setting resin applied to its surface, and a plurality of grating portions 103 of such a grating thickness d that the 1st order diffraction efficiency becomes 100% at a wavelength of 530 nm formed on the resin portion.

As is apparent from FIG. 17, the diffraction efficiency at the design order becomes lower as the wavelength goes away from the optimized wavelength 530 nm, while on the other hand, diffracted lights of 0th order and 2nd order in the vicinity of the design order are increased. This increase in the diffracted lights of the other orders than the design order becomes flare and leads to a reduction in the resolution of the optical system.

Figure 18:
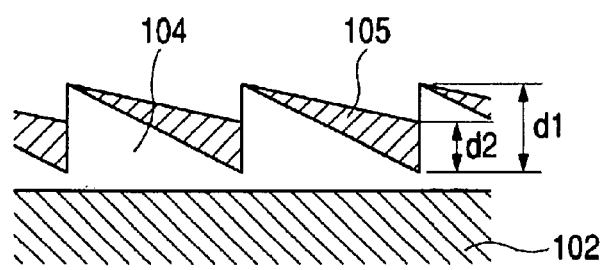
FIG. 18 is an illustration of a diffractive optical element of laminated structure.

So, a laminated type diffraction grating shown in FIG. 18 may be provided as the diffractive optical surface in each embodiment.

Figure 19:
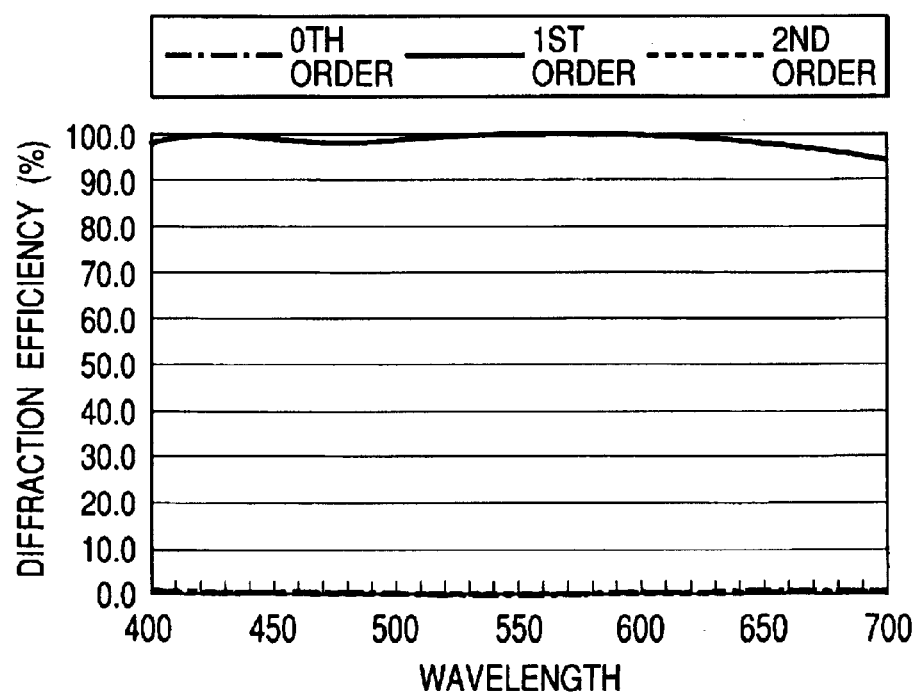
FIG. 19 is an illustration of the wavelength depending characteristic of the diffractive optical element of laminated structure.

FIG. 19 shows the wavelength depending characteristic of the 1st order diffraction efficiency of the diffractive optical element of such construction. As a specific construction, a first diffraction grating 104 formed of ultraviolet-setting resin (nd=1.499, vd=54) is formed on a substrate 102, and a second diffraction grating 105 formed of discrete ultraviolet-setting resin (nd=1.598, vd=28) is formed thereon. In this combination of the materials, the grating thickness d1 of the grating portion of the first diffraction grating 104 is d1=13.8 μm, and the grating thickness d2 of the grating portion of the second diffraction grating 105 is d2=10.5 μm.

As can be seen from FIG. 19, the diffraction efficiency of the design order is high diffraction efficiency of 95% or greater in the entire wavelength area used.

Figure 20:
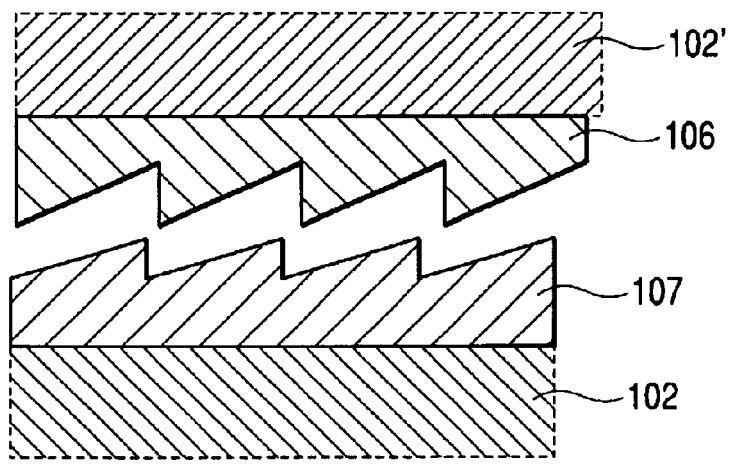
FIG. 20 is an illustration of a diffractive optical element of laminated structure.
Figure 21:
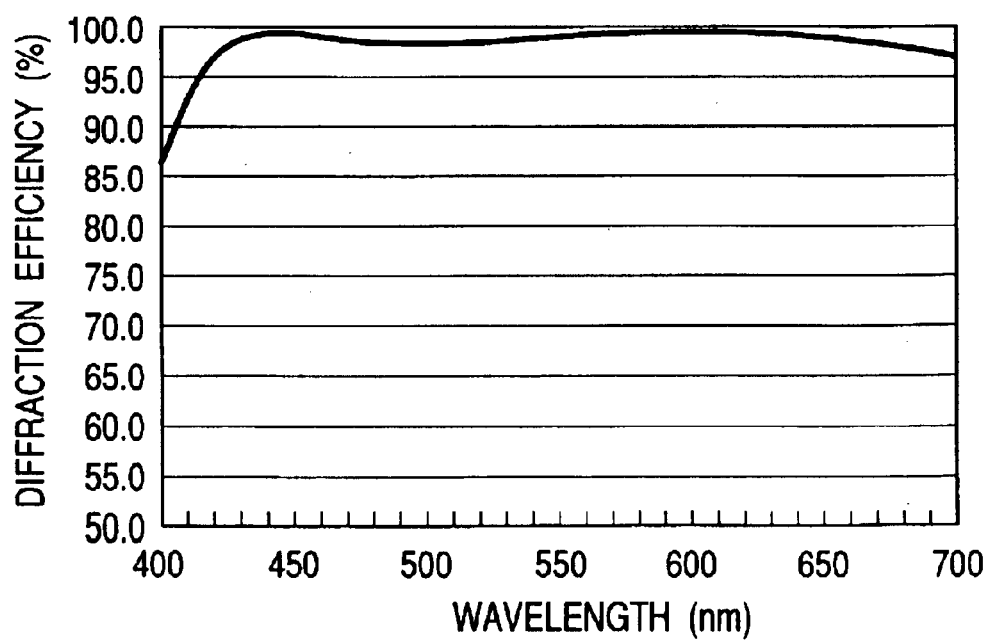
FIG. 21 is an illustration of the wavelength depending characteristic of the diffractive optical element of laminated structure.

Besides, a diffractive optical element of a two-layer construction with an air gap interposed between the two layers as shown in FIG. 20, or the like is also applicable. FIG. 21 shows the wavelength depending characteristic of the diffraction efficiency of the 1st order diffracted light of the diffractive optical element using two diffraction gratings 106 and 107 shown in FIG. 20. In FIG. 20, a first diffraction grating 107 formed of ultraviolet-setting resin is formed on a substrate 102, and a second diffraction grating 106 formed of ultraviolet-setting resin is formed on a substrate 102'.

As can be seen from FIG. 21, the diffraction efficiency of the design order is high diffraction efficiency of 95% or greater in the entire wavelength area used.

Figure 22:
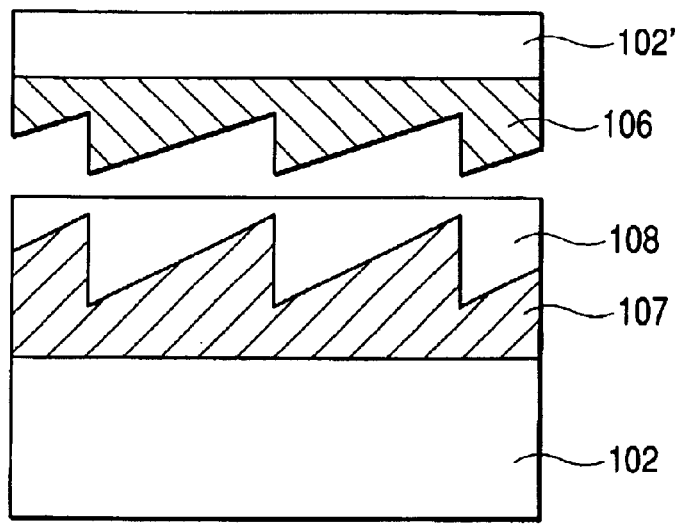
FIG. 22 is an illustration of a diffractive optical element of laminated structure.

FIG. 22 is an illustration of a diffractive optical element using three diffraction gratings 106, 107 and 108. If three or more layers are laminated as diffraction gratings, a better optical characteristic will be obtained.

Figure 23:
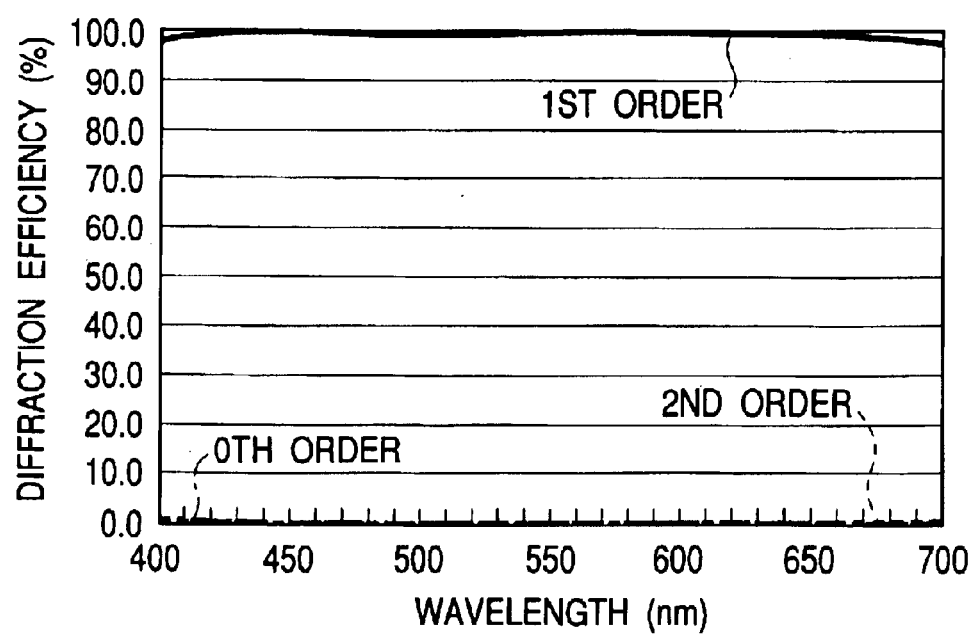
FIG. 23 is an illustration of the wavelength depending characteristic of the diffractive optical element of laminated structure.

FIG. 23 is an illustration of the wavelength depending characteristic of the diffraction efficiency of the 1st order diffracted light of the diffractive optical element shown in FIG. 22.

If the diffractive optical element of laminated structure shown in FIG. 22 is used, it becomes possible to decrease the grating thickness of the diffraction grating in a portion contacting with an air layer. Thereby, the flare by scattered light created on the wall portion of the edge of the diffraction grating (the side of the grating) is reduced and the mitigation of the reduction in diffraction efficiency resulting from an increase in the angle of incidence of light incident on the diffraction grating also becomes possible, and optical performance is further improved.

Also, the diffractive optical element used in each embodiment is made into a diffraction grating of laminated structure and is disposed on the joined surface of the lenses or the adjacent surfaces having a minute air space therebetween, whereby the diffraction grating can be made into a construction hardly touching the atmosphere, and the creation of unnecessary scattered light which deteriorates the quality of image due to the adherence of dust and stains is reduced.

By the diffraction grating of laminated structure being thus used as the diffractive optical element to be used in each embodiment of the present invention, optical performance is further improved.

The material of the aforedescribed diffractive optical element of laminated structure is not restricted to ultraviolet-setting resin, but other plastic material or the like can also be used, and depending on the substrate, the first diffraction grating may be formed directly on the substrate.

Figure 24:
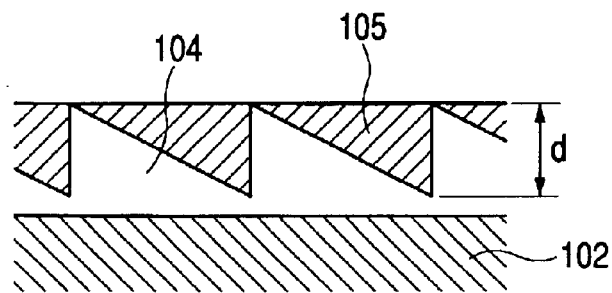
FIG. 24 is an illustration of a diffractive optical element of laminated structure.

Also, the thicknesses of the gratings need not differ from each other, but depending on the combination of materials, the grating thicknesses of two grating portions can be made equal to each other, as shown in FIG. 24. In this case, a grating shape is not formed on the surface of the diffractive optical element and therefore, the diffractive optical element is excellent in dust-proof property and the assembling property of the diffractive optical element is improved, and a more inexpensive optical system can be provided.

Also, the plurality of diffraction gratings of the diffractive optical element of laminated structure may be provided on the joined surfaces of a cemented lens. In this case, one lens constituting the cemented lens can be used as the substrate of a diffraction grating, and the other lens can be used as the substrate of other diffraction grating.

Figure 25:
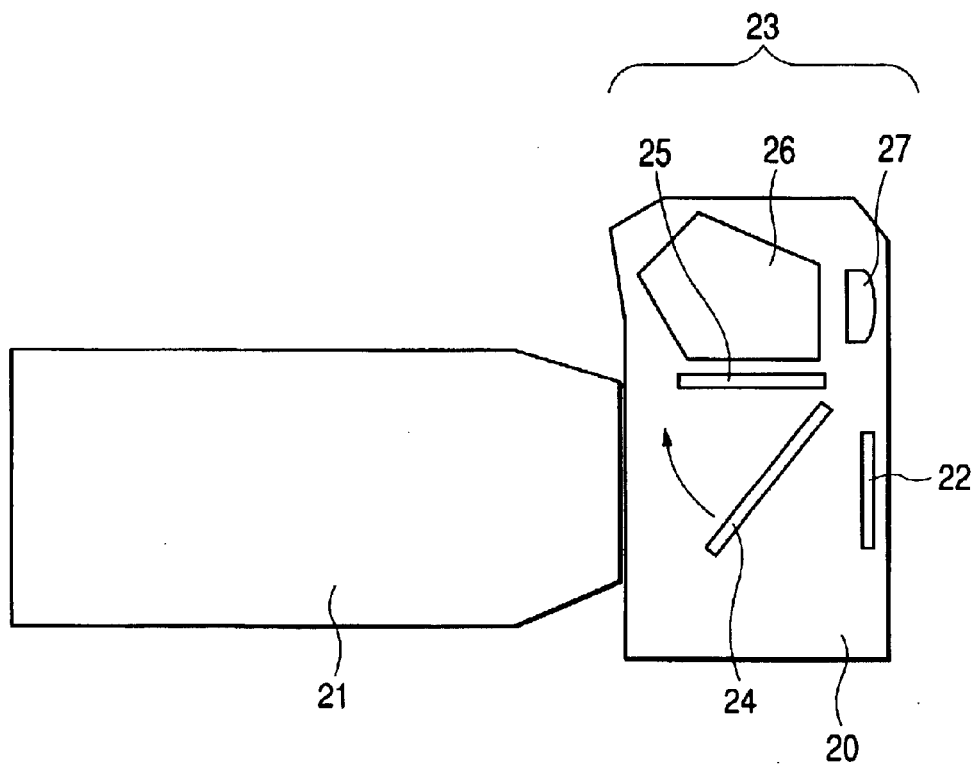
FIG. 25 is a schematic illustration of a single-lens reflex camera.

FIG. 25 is a schematic view of essential portions when the zoom lens described in each of the foregoing embodiments is applied to a single-lens reflex camera such as a camera for film or a digital camera.

In FIG. 25, the reference numeral 20 designates the main body of the camera, the reference numeral 21 denotes a photo-taking lens comprised of the zoom lens according to any one of Embodiments 1 to 3, and the reference numeral 22 designates image pick-up means comprising silver halide film or a solid state image pick-up device (photoelectric conversion element) such as a CCD or a CMOS. The reference numeral 23 denotes a finder system having a focusing screen 25 on which an object image is formed by the photo-taking lens 21, a pentaprism 26 as image inverting means, and an eyepiece 27 for observing the object image on the focusing screen 25 therethrough. The reference numeral 24 designates a quick return mirror. The quick return mirror 24 is located in the optical path of the photo-taking lens 21 during non-photographing, as shown in FIG. 25, and directs lights from an object to the finder system 23. When a release button, not shown, is depressed by a photographer, the quick return mirror 24 is rotated as indicated by arrow in FIG. 25 and is retracted from the optical path of the photo-taking lens 21, and the light from the object is directed to the image pick-up means 22.

Next, Numerical Examples 1, 2 and 3 corresponding to Examples 1, 2 and 3 will be shown. In each numerical embodiment, i indicates the order of the optical surfaces from the object side, ri indicates the radius of curvature of the ith optical surface (the ith surface), di indicates the interval between the ith surface and the (i+1)th surface, and ni and vi indicate the refractive index and Abbe number, respectively, of the material of the ith optical member for d line. Here, the units of the radius of curvature and the surface interval are millimeters (mm).

f represents the focal length, Fno represents F number, and a represents a half angle of view. Also, when k is eccentricity and B, C, D, E, F, ... are aspheric coefficients and the displacement in the direction of the optical axis at the position of a height h from the optical axis is defined as x with the surface vertex as the reference, the aspherical surface shape is represented by $$x = \frac{h^2/R}{1+\{1-(1+k)(h/R)^2\}^{1/2}} + Bh^4 + Ch^6 + Dh^8 + Eh^{10} \ldots,$$

where R is the radius of curvature. Also, for example, the expression "e-Z" means "$10^{-z}$".

In each numerical example, the surface indicated by D is the diffractive optical surface, and the surface indicated by AL is an aspherical surface.

Here, the phase shape φ of the diffractive optical surface in each numerical embodiment which performs diffracting action is defined by the following expression:

$$\phi(h,m) = (2\pi/m\lambda 0)(C_1 h^2 + C_2 h^4 + C_3 h^6 \ldots),$$

where h is the height in a direction perpendicular to the optical axis, m is the diffraction order of diffracted light, λ0 is the design wavelength, and Ci is a phase coefficient (i=1, 2, 3, ... ).

At this time, the refractive power φD of the diffractive optical surface D for any wavelength λ and any diffraction order m can be represented as follows by the use of the phase coefficient $C_1$ of the lowest order:

$$\phi D(\lambda,m) = -2C_1 m\lambda/\lambda 0$$

In each numerical embodiment, the diffraction order m of the diffracted light is 1, and the design wavelength λ0 is the wavelength (587.56 nm) of d line.

Numerical Example 1 f = 72.0~135.0~292.0    $F_{no}$ = 4.12~5.88    2ω = 33.0°~8.0°

| | | | |
|---|---|---|---|
| r1 = 74.743 | d1 = 2.00 | n1 = 1.85026 | v1 = 32.3 |
| r2 = 53.695(X·D) | d2 = 7.22 | n2 = 1.48749 | v2 = 70.2 |
| r3 = 1845.210 | d3 = 0.15 | | |
| r4 = 127.374 | d4 = 3.53 | n3 = 1.48749 | v3 = 70.2 |
| r5 = 1089.863 | d5 = Variable | | |
| r6 = −102.684 | d6 = 1.80 | n4 = 1.72600 | v4 = 53.6 |
| r7 = 29.654 | d7 = 6.63 | | |
| r8 = 42.638 | d8 = 3.11 | n5 = 1.75520 | v5 = 27.5 |
| r9 = 167.276 | d9 = Variable | | |
| r10 = (Stop) | d10 = 2.00 | | |
| r11 = 90.981 | d11 = 1.69 | n6 = 1.68893 | v6 = 31.1 |
| r12 = 48.390 | d12 = 6.23 | n7 = 1.48749 | v7 = 70.2 |
| r13 = −41.362 | d13 = Variable | | |
| r14 = 81.541 | d14 = 5.22 | n8 = 1.48749 | v8 = 70.2 |
| r15 = −35.407 | d15 = 1.50 | n9 = 1.83400 | v9 = 37.2 |
| r16 = −288.820 | d16 = 0.15 | | |
| r17 = 47.726 | d17 = 3.42 | n10 = 1.48749 | v10 = 70.2 |
| r18 = −206.488 | d18 = Variable | | |
| r19 = 102.930 | d19 = 1.50 | n11 = 1.83481 | v11 = 42.7 |
| r20 = 26.921 | d20 = 1.46 | | |
| r21 = 2517.649 | d21 = 1.50 | n12 = 1.81554 | v12 = 44.4 |
| r22 = 24.215 | d22 = 2.64 | n13 = 1.84666 | v13 = 23.8 |
| r23 = 89.707 | | | |

| | Focal Length | | |
|---|---|---|---|
| Variable Interval | 72.0 | 135.0 | 292.0 |
| d5 | 5.12 | 8.81 | 64.02 |
| d9 | 45.62 | 25.90 | 8.52 |
| d13 | 0.80 | 5.46 | 10.12 |
| d18 | 17.72 | 12.61 | 0.80 |

Phase Coefficient (r2)

C1 = −5.1444e−5
C2 = 1.0024e−8
C3 = −3.1463e−12
C4 = −3.5462e−15

Numerical Example 2 f = 72.0~135.0~292.0    Fno = 4.12~5.88    2ω = 33.0°~8.8°

| | | | |
|---|---|---|---|
| r1 = 62.751 | d1 = 2.00 | n1 = 1.83400 | v1 = 37.2 |
| r2 = 42.666(X·D) | d2 = 9.50 | n2 = 1.52542 | v2 = 84.5 |
| r3 = −583.519 | d3 = Variable | | |
| r4 = −90.732 | d4 = 1.80 | n3 = 1.77250 | v3 = 49.6 |
| r5 = 29.890 | d5 = 4.25 | | |
| r6 = −49.894 | d6 = 1.52 | n4 = 1.85026 | v4 = 32.3 |
| r7 = −66.233 | d7 = 0.15 | | |
| r8 = 50.216 | d8 = 3.80 | n5 = 1.68893 | v5 = 31.1 |
| r9 = −120.953 | d9 = Variable | | |
| r10 = (Stop) | d10 = 2.00 | | |
| r11 = 44.742 | d11 = 3.02 | n6 = 1.81554 | v6 = 44.4 |
| r12 = 141.141 | d12 = 5.44 | | |
| r13 = 213.110 | d13 = 1.50 | n7 = 1.83400 | v7 = 37.2 |
| r14 = 33.454 | d14 = 6.32 | n8 = 1.48749 | v8 = 70.2 |
| r15 = −37.184 | d15 = | | |
| r16 = 140.030 | d16 = 4.44 | n9 = 1.48749 | v9 = 70.2 |
| r17 = −27.204 | d17 = 1.50 | n10 = 1.83400 | v10 = 37.2 |
| r18 = −134.558 | d18 = 0.15 | | |
| r19 = 38.629 | d19 = 2.92 | n11 = 1.65160 | v11 = 58.5 |
| r20 = 587.723 | d20 = Variable | | |
| r21 = −6905.360 | d21 = 1.50 | n12 = 1.83481 | v12 = 42.7 |
| r22 = 28.786 | d22 = 1.41 | | |
| r23 = −1024.889 | d23 = 1.50 | n13 = 1.80400 | v13 = 46.6 |
| r24 = 24.322 | d24 = 2.87 | n14 = 1.84666 | v14 = 23.8 |
| r25 = 139.823 | | | |

-continued

Numerical Example 2

| | Focal Length | | |
|---|---|---|---|
| Variable Interval | 72.0 | 135.0 | 292.0 |
| d3 | 4.76 | 15.27 | 71.34 |
| d9 | 42.74 | 22.56 | 2.70 |
| d15 | 0.80 | 3.30 | 7.76 |
| d20 | 15.10 | 10.98 | 0.87 |

Phase Coefficient (r2)

C1 = −6.3908e−5
C2 = 1.4616e−8
C3 = −1.2917e−11
C4 = −6.3754e−15

Numerical Example 3 f = 29.0~50.0~101.3    Fno = 4.12~5.83    2ω = 73.5°~24.4°

| | | | |
|---|---|---|---|
| r1 = 55.925 | d1 = 1.50 | n1 = 1.84666 | ν1 = 23.8 |
| r2 = 38.578 | d2 = 7.12 | n2 = 1.72600 | ν2 = 53.6 |
| r3 = 300.006 | d3 = Variable | | |
| r4 = −33967.690(AL) | d4 = 1.50 | n3 = 1.83481 | ν3 = 42.7 |
| r5 = 16.908 | d5 = 6.31 | | |
| r6 = −221.855 | d6 = 1.50 | n4 = 1.48749 | ν4 = 70.2 |
| r7 = 18.175(D) | d7 = 5.54 | n5 = 1.85026 | ν5 = 32.3 |
| r8 = 76.281 | d8 = Variable | | |
| r9 = (Stop) | d9 = 2.75 | | |
| r10 = 19.594 | d10 = 3.94 | n6 = 1.71999 | ν6 = 50.2 |
| r11 = −23.797 | d11 = 1.50 | n7 = 1.83400 | ν7 = 37.2 |
| r12 = 87.028 | d12 = 4.38 | | |
| r13 = −56.402 | d13 = 1.50 | n8 = 1.68893 | ν8 = 31.1 |
| r14 = −127.986 | d14 = Variable | | |
| r15 = 24.061 | d15 = 3.63 | n9 = 1.48749 | ν9 = 70.2 |
| r16 = −26.752 | d16 = 0.50 | | |
| r17 = −223.857(AL) | d17 = 1.50 | n10 = 1.83481 | ν10 = 42.7 |
| r18 = 37.938 | | | |

| | Focal Length | | |
|---|---|---|---|
| Variable Interval | 29.0 | 50.0 | 101.3 |
| d3 | 2.74 | 10.65 | 32.42 |
| d8 | 28.98 | 13.28 | 1.62 |
| d14 | 3.06 | 1.64 | 0.85 |

| Phase Coefficient (r7) | Aspheric Coefficient (r4) | Aspheric Coefficient (r18) |
|---|---|---|
| C1 = 8.6851e−5 | K = −5.03997e+14 | K = 3.867746e+2 |
| C2 = 9.06001e−7 | B = 4.01231e−6 | B = −4.15791e−5 |
| C3 = −7.0420e−9 | C = −3.78566e−9 | C = −8.15495e−8 |
| C4 = 1.5510e−11 | D = 2.39505e−12 | D = 4.15887e−11 |

What is claimed is:

1. A zoom lens system comprising, in order from the front to the rear:

a first lens unit of positive optical power;

a second lens unit of negative optical power; and a following lens component of positive optical power as a whole;

wherein the first lens unit moves during zooming so that the interval between the first lens unit and the second lens unit may become great at the telephoto end relative to the wide angle end, at least one of the first lens unit, the second lens unit and lens units included in the succeeding lens component moves for focusing resulting from a change in an object distance, and the at least one lens unit moving for the focusing has at least one diffractive optical surface.

2. A zoom lens system according to claim 1, wherein the lens unit moves for the focusing has joined surfaces, and the diffractive optical surface is provided on the joined surfaces.

3. A zoom lens system according to claim 2, wherein the joined surfaces are adjacent surfaces opposed to each other with a minute air space interposed therebetween.

4. A zoom lens system according to claim 1, wherein the first lens unit moves for the focusing resulting from a change in the object distance.

5. A zoom lens system according to claim 1, wherein the second lens unit moves for the focusing resulting from a change in the object distance.

6. A zoom lens system according to claim 1, wherein the succeeding lens component is comprising, in order from the front to the rear:

a third lens unit of positive refractive power;

a fourth lens unit of positive refractive power; and a fifth lens unit of negative refractive power;

wherein the respective lens units move during zooming so that the interval between the second lens unit and the third lens unit may become small at the telephoto end relative to the wide angle end, the interval between the third lens unit and the fourth lens unit may become great at the telephoto end relative to the wide angle end, and the interval between the fourth lens unit and the fifth lens unit may become small at the telephoto end relative to the wide angle end.

7. A zoom lens system according to claim 1, wherein the succeeding lens component comprising, in succession from the front to the rear:

a third lens unit of positive refractive power; and a fourth lens unit of positive refractive power;

wherein the respective lens units move during zooming so that the interval between the second lens unit and the third lens unit may become small at the telephoto end relative to the wide angle end, and the interval between the third lens unit and the fourth lens unit may become small at the telephoto end relative to the wide angle end.

8. A zoom lens system according to claim 1, which forms an image on a photoelectric conversion element.

9. A camera comprising:

a zoom lens system according to claim 1; and a photoelectric conversion element for receiving an image formed by the zoom lens system.

* * * * *